United States Patent
Ahmed et al.

(10) Patent No.: US 12,522,029 B2
(45) Date of Patent: Jan. 13, 2026

(54) WHEEL VALVE ASSEMBLY FOR TIRE INFLATION/DEFLATION SYSTEM

(71) Applicant: Parker-Hannifin Corporation, Cleveland, OH (US)

(72) Inventors: Shahed M. Ahmed, Portage, MI (US); Patrick D. O'Connell, Paw Paw, MI (US); Brian A. Reynolds, Richland, MI (US); William B. McCurdy, Jr., Galesburg, MI (US); Yufeng Qi, Ada, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 388 days.

(21) Appl. No.: 17/906,886

(22) PCT Filed: Jun. 11, 2021

(86) PCT No.: PCT/US2021/036908
§ 371 (c)(1),
(2) Date: Sep. 21, 2022

(87) PCT Pub. No.: WO2022/035497
PCT Pub. Date: Feb. 17, 2022

(65) Prior Publication Data
US 2023/0173854 A1    Jun. 8, 2023

Related U.S. Application Data

(60) Provisional application No. 63/064,539, filed on Aug. 12, 2020.

(51) Int. Cl.
*B60C 23/00* (2006.01)
*F16K 15/06* (2006.01)
(Continued)

(52) U.S. Cl.
CPC .. *B60C 23/00354* (2020.05); *B60C 23/00318* (2020.05); *F16K 15/063* (2013.01);
(Continued)

(58) Field of Classification Search
CPC ............ Y10Y 137/36; Y10Y 137/3631; Y10Y 137/3646; B60C 23/00354
See application file for complete search history.

(56) References Cited

U.S. PATENT DOCUMENTS

| | | | |
|---|---|---|---|
| 4,765,385 A * | 8/1988 | McGeachy | B60C 23/00354 152/416 |
| 7,089,953 B2 * | 8/2006 | Beau | B60C 23/00354 152/416 |

(Continued)

FOREIGN PATENT DOCUMENTS

| | | |
|---|---|---|
| DE | 3246601 A1 | 6/1984 |
| DE | 3247371 A1 | 6/1984 |
| WO | 2019/147766 A1 | 8/2019 |

OTHER PUBLICATIONS

International Search Report and Written Opinion of the International Searching Authority for corresponding International Patent Application No. PCT/US2021/036908, mailed Nov. 29, 2021.

Primary Examiner — Robert K Arundale
(74) Attorney, Agent, or Firm — Renner, Otto, Boisselle & Sklar, LLP

(57) ABSTRACT

A valve assembly for a tire inflation/deflation system includes a body having a control port and a tire port, and a valve member for fluidly connecting or disconnecting the control port with the tire port. In one embodiment, the valve includes a fluid-operated damper having a damper chamber for controlling a timing of the valve member. A vent valve is provided for permitting excess fluid pressure to escape from the damper chamber. In another embodiment, the valve member includes a diaphragm separating first and second (Continued)

fluid chambers. A vent passage and at least one resilient fluid pressure-operated valve element are provided for enabling fluid to vent from the first chamber to the second chamber. Multiple-redundant valve elements may be provided to form an isolation gap that restricts contamination of the valve assembly.

17 Claims, 12 Drawing Sheets

(51) Int. Cl.
*F16K 15/20* (2006.01)
*F16K 17/34* (2006.01)
*F16K 47/00* (2006.01)

(52) U.S. Cl.
CPC .......... *F16K 15/202* (2013.01); *F16K 15/207* (2013.01); *F16K 17/34* (2013.01); *F16K 47/0111* (2021.08)

(56) References Cited

U.S. PATENT DOCUMENTS

| | | | |
|---|---|---|---|
| 9,415,645 B2 * | 8/2016 | Racine | B60C 23/00318 |
| 10,131,192 B2 | 11/2018 | Jabcon et al. | |
| 10,479,150 B2 | 11/2019 | Balistreri et al. | |
| 11,787,239 B2 * | 10/2023 | Beverly | B60C 23/00354 |
| | | | 152/417 |
| 2007/0204946 A1 * | 9/2007 | Medley | B60B 25/20 |
| | | | 152/427 |
| 2016/0144675 A1 * | 5/2016 | Knepple | B60C 23/001 |
| | | | 137/12 |
| 2018/0022168 A1 * | 1/2018 | Dunning | B60C 23/00354 |
| | | | 152/417 |
| 2019/0329603 A1 * | 10/2019 | Qi | B60C 23/00372 |

* cited by examiner

WHEEL VALVE ASSEMBLY FOR TIRE INFLATION/DEFLATION SYSTEM

RELATED APPLICATIONS

This application is a national phase of International Application No. PCT/US2021/036908 filed Jun. 11, 2021, which claims the benefit of U.S. Provisional Application No. 63/064,539 filed Aug. 12, 2020, each of which is hereby incorporated herein by reference in its entirety.

TECHNICAL FIELD

The present disclosure relates to a tire inflation/deflation system, and more particularly to a wheel valve assembly for a tire inflation/deflation system.

BACKGROUND

A tire inflation/deflation system for a vehicle, such as a central tire inflation/deflation system (CTIS), provides the vehicle with the versatility of adjusting tire pressures while the vehicle is stationary or in motion. For example, the tire pressure of one or more wheel assemblies of the vehicle that are in fluid communication with the tire inflation/deflation system may be decreased to increase tire traction, or increased to reduce rolling resistance and increase the vehicle's fuel efficiency and tire life-span. In addition, tire inflation/deflation systems increase a vehicle's maneuverability over differing terrains and reduce maintenance requirements. Drivers of vehicles with a tire inflation/deflation system may directly control pressure in each tire to enhance mobility of the vehicle based on the terrain. Also, the tire inflation/deflation system may maintain a desired pressure to counteract leaks in each tire.

A tire inflation/deflation system, such as a CTIS, typically includes an air supply source in selective fluid communication with a tire via a pneumatic conduit. The pneumatic conduit may include a wheel valve with a pressure-side port for allowing the air supply source to provide pressurized air to the tire and alternatively for allowing the tire to deflate. Typically, the pressure-side port fluidly connects to only a single fluid flow line. The single fluid flow line carries airflow from the pressure source to the wheel valve and carries exhaust airflow from the tire via the pressure-side port of the wheel valve.

SUMMARY

One problem with conventional wheel valves for tire inflation/deflation systems is that the reliable control of the wheel valve may be susceptible to environmental factors, such as changes in fluid pressure and/or contamination of the valve by debris or the like.

An aspect of the present disclosure provides an improvement in the reliable control of a wheel valve assembly for a tire inflation/deflation system, such as for a CTIS.

For example, according to an aspect, a wheel valve assembly for a tire inflation/deflation system includes a fluid-operated damper that is configured to control the timing of a valve member of the wheel valve assembly, in which the wheel valve assembly further includes a vent passage fluidly connected to a fluid chamber of the damper and at least one vent valve that is configured to open or close the vent passage, such that when the vent valve is activated to open the vent passage, fluid in the damper chamber is permitted to escape, thereby maintaining a desired pressure level in the damper chamber.

By maintaining the desired pressure level in the damper fluid chamber, the reliable control of the valve member timing may be improved. Such features may be particularly advantageous when leakage of fluid (e.g., air) into the damper fluid chamber increases the pressure level therein, resulting in changes to the valve member timing. Allowing the excess fluid pressure within the damper chamber to escape via the exemplary vent feature thereby maintains the timing of the valve member within a suitable range according to the design parameters of the wheel valve assembly.

In exemplary embodiments, the vent valve is a resilient fluid pressure-energized valve element that is energized by fluid pressure within the system to enhance sealing performance when the valve element closes the vent passage. The resilient valve element may be activated to open the vent passage when a pressure differential on opposite sides of the resilient valve element reaches or exceeds a certain level.

In exemplary embodiments, the resilient fluid pressure-energized valve element is a lip seal, such as a U-cup seal.

The vent valve or multiple vent valves also may be suitably configured to reduce contamination internal to the wheel valve assembly. Such contamination may include dirt, oil, tire talc, sand, salt, water, snow, or other such contaminants exposed to the vehicle during use.

In exemplary embodiments, a multiple-redundant configuration of the vent valves may be employed to enhance the contamination mitigating effect. For example, the multiple vent valves may be configured to provide a suitable isolation gap between the vent valves which serves as an airlock-type feature for trapping contaminants.

The use of a damper with the exemplary wheel valve assembly can prevent immediate closure of the valve by dampening movement of the valve member to its closed position. Preventing immediate closure of the valve enables the valve to overcome one or more shortcomings of diaphragm-style valves.

The wheel valve according to an aspect of the present disclosure may be placed into existing tire inflation systems in place of existing valves, without modifying pneumatic lines of the existing inflation system. Thus, the exemplary valve may be operated by a single fluid flow line, receive pressure from the single fluid flow line, and exhaust to the single fluid flow line, for example.

According to an aspect, a valve for use in an inflation/deflation system, includes: a valve body having a first inlet/outlet port fluidly connectable to a second inlet/outlet port; a valve member movable within the valve body between a first position and a second position for fluidly connecting or disconnecting the first inlet/outlet port and the second inlet/outlet port; and a fluid-operated damper operably connected to the valve member to dampen movement of the valve member from the second position to the first position; wherein, when in a first state, the first inlet/outlet port is fluidly disconnected from the second inlet/outlet port by the valve member; wherein the valve is configured to transition to a second state when a fluid pressure at the first inlet/outlet port is at or above a prescribed pressure threshold, and when in the second state the first inlet/outlet port is fluidly disconnected from the second inlet/outlet port; wherein, when the valve is in the second state, lowering the fluid pressure below the prescribed pressure threshold causes the valve to transition from the second state to a third state; wherein, when in the third state, the first inlet/outlet port is fluidly connected to the second inlet/outlet port while the damper dampens movement of the valve member from the second position to the first position to maintain the valve in the third state for a prescribed period of time; wherein the damper includes a damper fluid chamber; and wherein the valve further includes a vent passage fluidly connected to the damper fluid chamber, and a vent valve configured to open and close the vent passage, such that when the vent passage is opened by the vent valve fluid is permitted to vent from the damper fluid chamber.

According to another aspect, a valve for use in an inflation/deflation system, includes: a valve body having a first inlet/outlet port fluidly connectable to a second inlet/outlet port; a valve member movable within the valve body between a first position and a second position for fluidly connecting or disconnecting the first inlet/outlet port and the second inlet/outlet port; and a fluid-operated damper operably connected to the valve member to dampen movement of the valve member from the second position to the first position; wherein, when in a first state, the first inlet/outlet port is fluidly disconnected from the second inlet/outlet port by the valve member; wherein the valve is configured to transition to a second state when a fluid pressure at the first inlet/outlet port is at or above a prescribed pressure threshold, and when in the second state the first inlet/outlet port is fluidly disconnected from the second inlet/outlet port; wherein, when the valve is in the second state, lowering the fluid pressure below the prescribed pressure threshold causes the valve to transition from the second state to a third state; wherein, when in the third state, the first inlet/outlet port is fluidly connected to the second inlet/outlet port while the damper dampens movement of the valve member from the second position to the first position to maintain the valve in the third state for a prescribed period of time; wherein the fluid-operated damper includes a body portion that at least partially forms a fluid timing chamber, and a timing piston movable in the timing chamber, the timing piston separating the timing chamber into a first portion and a second portion; and wherein the body portion includes a restrictive fluid passage for restricting fluid flow from the first portion of a timing chamber to the second portion of the timing chamber.

According to another aspect, a valve for use in an inflation/deflation system, includes: a valve body having a first inlet/outlet port fluidly connectable to a second inlet/outlet port; a valve member movable within the valve body between a first position and a second position for fluidly connecting or disconnecting the first inlet/outlet port and the second inlet/outlet port; and a fluid-operated damper operably connected to the valve member to dampen movement of the valve member from the second position to the first position; wherein, when in a first state, the first inlet/outlet port is fluidly disconnected from the second inlet/outlet port by the valve member; wherein the valve is configured to transition to a second state when a fluid pressure at the first inlet/outlet port is at or above a prescribed pressure threshold, and when in the second state the first inlet/outlet port is fluidly disconnected from the second inlet/outlet port; wherein, when the valve is in the second state, lowering the fluid pressure below the prescribed pressure threshold causes the valve to transition from the second state to a third state; wherein, when in the third state, the first inlet/outlet port is fluidly connected to the second inlet/outlet port while the damper dampens movement of the valve member from the second position to the first position to maintain the valve in the third state for a prescribed period of time; wherein the damper includes a damper fluid chamber, a timing piston movable in the damper fluid chamber, and a seal member disposed in a radial groove of the timing piston for abutting a surface forming at least a portion of the damper fluid chamber, wherein the seal member is movable within the radial groove of the timing piston to serve as a check valve, the check valve being configured to restrict fluid flow from a first portion of the timing chamber to a second portion of the timing chamber across the radial groove when the seal member engages a first axial face of the radial groove, and the check valve being configured to permit fluid flow from the second portion of the timing chamber to the first portion of the timing chamber across the radial groove when the seal member engages a second axial face of the radial groove; and wherein at least one of the first axial face and the second axial face includes a stepped surface for reducing surface area contact with the seal member.

According to another aspect of the present disclosure, a diaphragm-style wheel valve assembly includes a unique fluid pressure-energized valve element configuration for improving the reliable performance and/or simplicity of the valve assembly.

For example, according to an aspect, a valve assembly includes: a body having a first body portion and a second body portion; a diaphragm disposed between the first body portion and the second body portion; a biasing member disposed between the second body portion and the diaphragm; a first chamber at least partially formed by the first body portion and the diaphragm; a second chamber at least partially formed by the second body portion and the diaphragm; a control port formed by the first body portion and in fluid communication with the first chamber; a tire port formed by the first body portion and in selective fluid communication with the first chamber; a fluid passage fluidly connecting the first chamber and the second chamber; and a resilient fluid pressure-energized valve element disposed in the fluid passage; wherein the resilient fluid pressure-energized valve element is configured to open or close the fluid passage in response to a fluid pressure differential between the first chamber and the second chamber that is communicated to opposite sides of the resilient fluid pressure-energized valve element.

According to another aspect, a central inflation/deflation system for a vehicle, includes: the valve according to any of the foregoing aspects or embodiments; a tire forming a fluid reservoir fluidly connected to the second inlet/outlet port of the valve; a fluid control system fluidly connected to the first inlet/outlet port of the valve; and a pressure source with an outlet fluidly connected to an inlet of the control system.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles and aspects according to the present disclosure have particular application to a tire inflation/deflation system, such as a central tire inflation/deflation system (CTIS), and in particular to a wheel valve assembly for a CTIS that permits inflation and deflation of vehicle tires, and thus will be described below chiefly in this context. It is understood, however, that the principles and aspects disclosed herein may be applicable to other fluid systems where it is desirable to reduce or increase pressure of a fluid other than a CTIS, as would be understood by those having ordinary skill in the art.

Figure 1:
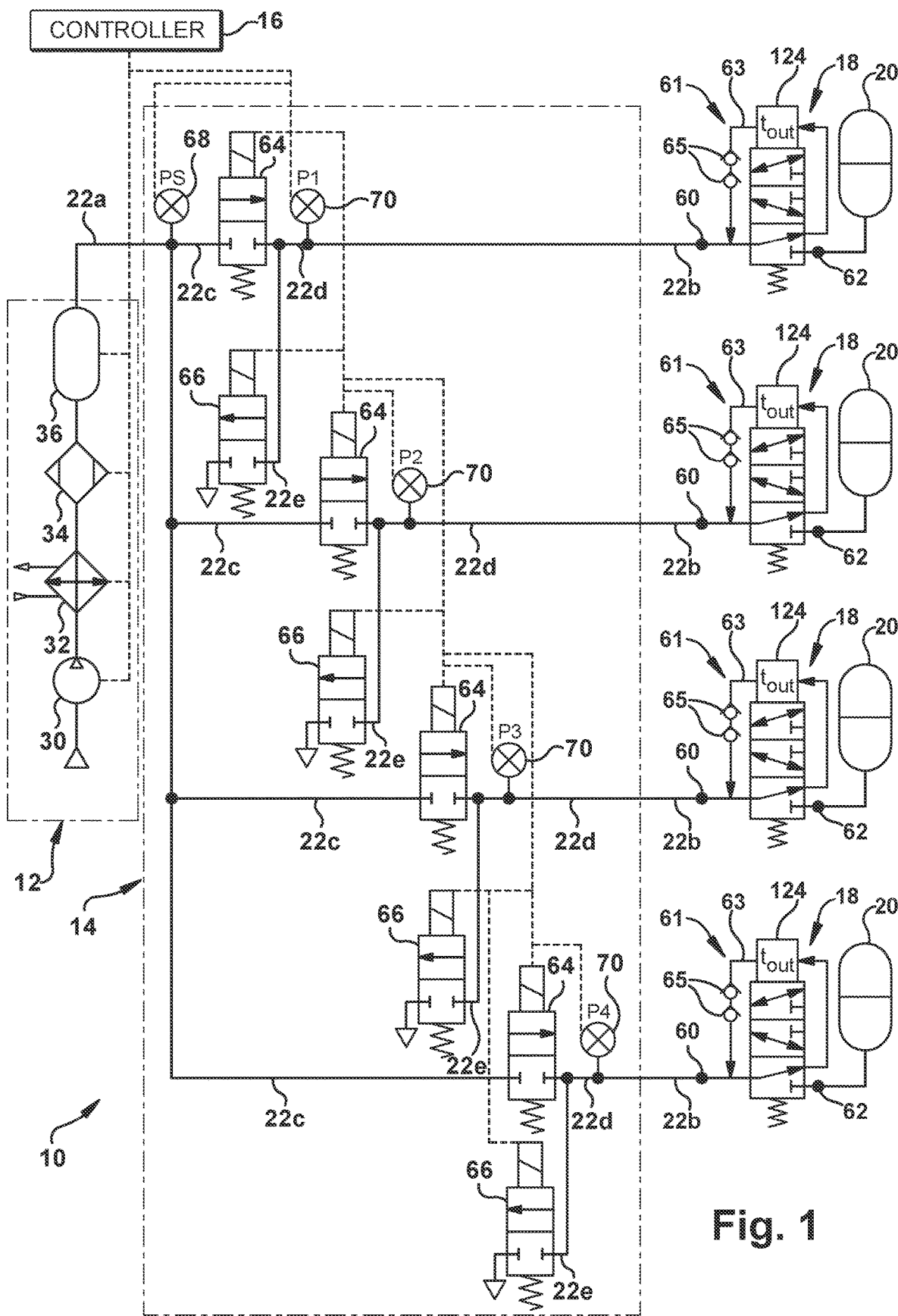
FIG. 1 is a schematic view of an exemplary central tire inflation/deflation system of a vehicle including a plurality of exemplary wheel valve assemblies according to an embodiment of the present disclosure which are shown in an exemplary closed state fluidly disconnecting a control system from each of a plurality of vehicle tires.

Referring now in detail to the drawings, and initially to FIG. 1, a portion of a vehicle with an exemplary tire inflation/deflation system 10 is illustrated schematically. In the illustrated embodiment, the tire inflation/deflation system 10 is a central tire inflation/deflation system (also referred to as CTIS 10 herein). As shown, the CTIS 10 generally includes a pressure source 12, a control system 14, a controller 16 that may control the pressure source 12 and the control system 14, one or more exemplary wheel valves 18, one or more fluid reservoirs, such as one or more vehicle tires 20, and one or more fluid flow lines 22a-22e. In the illustrated embodiment, the system 10 includes four tires 20 and four wheel valves 18 (also referred to as wheel valve assemblies, or simply valves), although the system 10 may include fewer or greater of such components.

In exemplary embodiments, the controller 16 may include a computer processor and a memory device to operate the pressure source 12 and the control system 14. Operation of the pressure source 12 and the control system 14 allows the controller 16 to control fluid flow from the pressure source 12 to operate each valve 18. Communication lines, illustrated as dashed lines, may operably connect the controller 16 to various components of the pressure source 12 and the control system 14 to allow operation of each valve 18. For example, the communication lines may allow electrical impulses to be communicated. In an embodiment, the communication lines are able to carry electrical signals to and from the controller 16. In another embodiment, the controller 16 may bi-directionally communicate with components of the vehicle, for example to determine a speed of the vehicle.

The controller 16 may operate the pressure source 12 and the control system 14 to control each valve 18 to be in a closed state, a charged state (also known as a "reset state" or an "initialized state"), or an open state. Each valve 18 may remain in the open state for a prescribed period of time to allow each corresponding vehicle tire 20 to be inflated or deflated.

The pressure source 12 may include a fluid pump 30, such as a pneumatic compressor, a cooler 32, an air dryer 34, and a system reservoir 36. The fluid pump 30 may include an intake port for receiving ambient fluid, such as ambient air, and may include an outlet fluidly connected to an inlet of the cooler 32. The cooler 32 may include an outlet fluidly connected to an inlet of the air dryer 34. The air dryer 34 may include an outlet fluidly connected to an inlet of the system reservoir 36.

The controller 16 may initiate the fluid pump 30 to suction ambient fluid, such as ambient air. If the ambient fluid is a compressible fluid, the fluid pump 30 may pressurize the fluid as the fluid pump 30 provides the fluid to the system reservoir 36 via the cooler 32 and the air dryer 34. For example, if the fluid pump 30 includes a compressor, the compressor may compress ambient air to provide pressurized air to the system reservoir 36 via the cooler 32 and the air dryer 34.

The fluid pump 30 may discharge pressurized fluid out of the outlet of the fluid pump 30 to provide the pressurized fluid to the inlet of the cooler 32. The cooler 32 may cool the pressurized fluid, which may cause the pressurized fluid to condense. For example, if the pressurized fluid is pressurized air, the pressurized air may condense which may cause the water in the pressurized air to condense.

The cooler 32 may discharge cooled pressurized air from the outlet of the cooler 32 to provide the cooled pressurized air to the inlet of the air dryer 34. The air dryer 34 may remove water molecules from the rest of the cooled pressurized air to prevent water from building up in the system reservoir 36, the control system 14, each valve 18, or each vehicle tire 20.

The air dryer 34 may discharge dried pressurized air out of the outlet of the air dyer 34 to provide the dried pressurized air to the inlet of the system reservoir 36. In an embodiment, the fluid pump 30 may provide fluid directly to the system reservoir 36.

The system reservoir 36 may hold pressurized fluid until the controller 16 instructs the system reservoir 36 discharge the pressurized fluid from an outlet of the system reservoir 36 to provide the pressurized fluid to an inlet of the control system 14 for operating each valve 18 and/or for inflating the corresponding vehicle tire 20. For example, the system reservoir 36 may hold pressurized air and discharge the pressurized air to the inlet of the control system 14. In an embodiment, the fluid pump may provide fluid directly to the control system 14.

The system reservoir 36 may provide pressurized fluid to each vehicle tire 20 via the fluid flow line 22a when the control system 14 fluidly connects the system reservoir 36 to each valve 18 and the valve 18 is open.

Each valve 18 may include a first inlet/outlet port 60 (also referred to as a control port) fluidly connected to an outlet of the control system 14, which ultimately may be fluidly connected to ambient fluid (e.g., ambient air), as described above. Each valve 18 also may include a second inlet/outlet port 62 (also referred to as a tire port) fluidly connected to the corresponding vehicle tire 20 via a fluid flow line. In an embodiment, more than four valves are provided, for example, 6 or 8 valves may be provided. In another embodiment less than four valves are provided.

Figure 2:
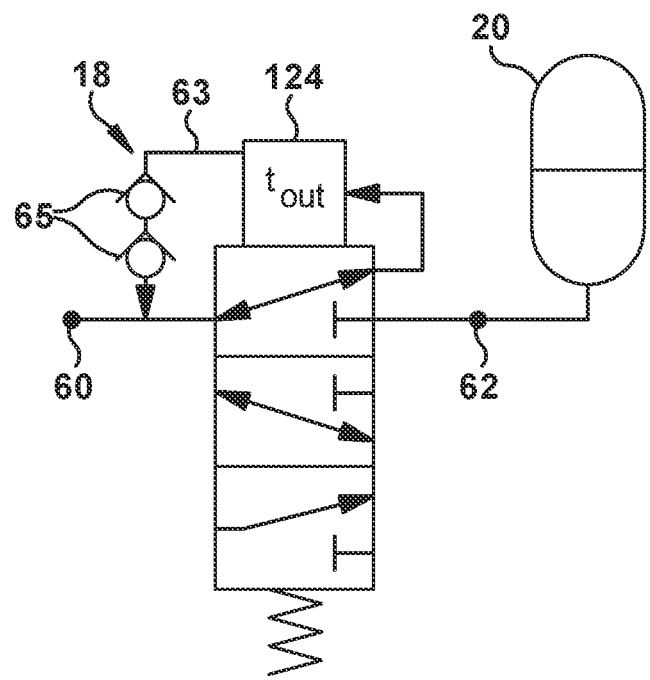
FIG. 2 is a schematic view of a portion of the central tire inflation/deflation system of FIG. 1 showing the exemplary wheel valve assembly in an exemplary charged state fluidly disconnecting a first inlet/outlet port of the valve from a second inlet/outlet port of the valve.
Figure 3:
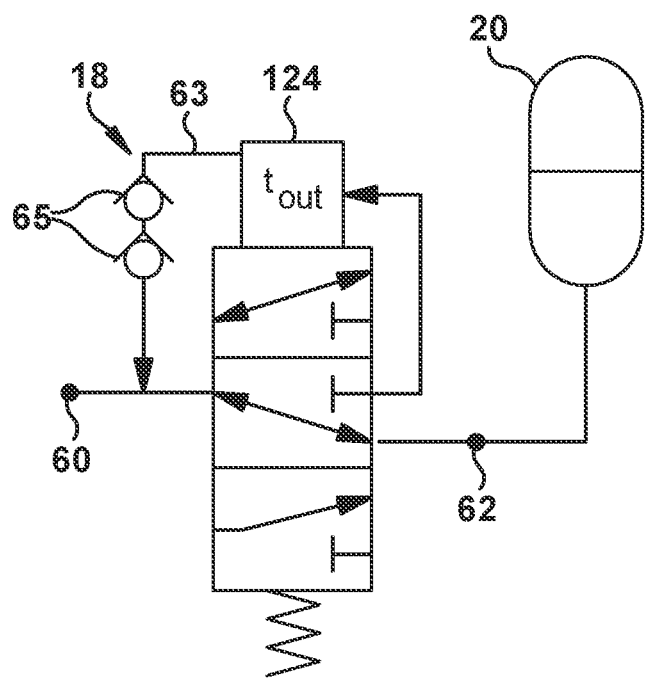
FIG. 3 is a schematic view of a portion of the central tire inflation/deflation system of FIG. 1 including the exemplary wheel valve assembly in an exemplary open state fluidly connecting the first inlet/outlet port of the valve to the second inlet/outlet port of the valve.

In the closed state, the valve 18 may be closed, thereby fluidly disconnecting the first inlet/outlet port 60 from the second inlet/outlet port 62. In the charged state (as shown in FIG. 2), the valve 18 may be closed. In the open state (as shown in FIG. 3), the valve 18 may be open, thereby fluidly connecting the first inlet/outlet port 60 to the second inlet/outlet port 62. As illustrated schematically, the valve 18 may remain in the open state for a prescribed period of time. While open, the valve 18 may allow the vehicle tire 20 to be inflated or to be deflated.

As shown in the illustrated embodiment, the valve 18 includes an exemplary vent feature 61, which includes a vent passage 63 and one or more exemplary vent valves 65. The vent passage 63 is fluidly connected to a fluid chamber of a damper 124 of the valve 18 (described in further detail below) to enable fluid to escape from the fluid chamber and thereby relieve pressure. In the illustrated embodiment, the vent feature 61 provides internal venting such that the vent passage 63 fluidly connects the fluid chamber of the damper 124 with the first/inlet outlet port 60. As shown, one or more of the vent valves 65 may include a check valve that restricts fluid flow into the chamber of the damper 124, and permits fluid flow out of the damper chamber at a certain pressure level, as discussed below particularly with reference to FIG. 10.

As shown in the illustrated embodiment, the control system 14 may include one or more fluid flow lines 22c-22e, one or more supply valves 64, one or more external venting valves 66, at least one supply pressure sensor 68, and one or more inflation/deflation pressure sensors 70. In the illustrated embodiment, the control system 14 includes four supply valves 64, four external venting valves 66, and four inflation/deflation pressure sensors 70 to correspond with the four tires 20. In another embodiment, the fluid flow lines of the control system may form at least a portion of the fluid flow lines of the central tire inflation/deflation system that fluidly connect the control system to the pressure source and to each valve. In another embodiment, the fluid flow lines of the central tire inflation/deflation system—that connect the control system to the pressure source and to each valve—may form at least a portion of the fluid flow lines of the control system.

Each fluid flow line 22c-22e may fluidly connect each supply valve 64 and each external venting valve 66 to at least one of the pressure source 12 or to the valve 18. Each fluid flow line 22c may fluidly connect the inlet of the corresponding supply valve 64 to the outlet of the pressure source 12. For example, each fluid flow line 22c may fluidly connect to the fluid flow line 22a.

Each fluid flow line 22d may fluidly connect the outlet of the corresponding supply valve 64 to the first inlet/outlet port 60 of the corresponding valve 18. For example, each fluid flow line 22d may fluidly connect to the corresponding fluid flow line 22b. Fluidly connecting each supply valve 64 to the corresponding first inlet/outlet port 60 allows each supply valve 64 to provide pressurized fluid to the corresponding first inlet/outlet port 60 to control each valve 18.

Controlling each valve 18 to open allows the pressure source 12 to provide pressurized fluid through the fluid flow line 22a to the control system 14 to each fluid flow line 22b and to the vehicle tire 20. The pressurized fluid may flow into each valve 18 through the corresponding first inlet/outlet port 60 and flow out of each valve 18 through the corresponding second inlet/outlet port 62 to allow the pressurized fluid to flow into each vehicle tire 20, which may cause inflation of each vehicle tire 20.

Controlling each valve 18 to open also allows each vehicle tire 20 to provide pressurized fluid through the corresponding fluid flow line 22b to the control system 14 where the pressurized fluid may be expelled through the corresponding external venting valve 66. The pressurized fluid may flow into each valve 18 through the corresponding second inlet/outlet port 62, through the corresponding first inlet/outlet port 60, through the corresponding fluid flow line 22b, and through the corresponding fluid flow line 22e. From the corresponding fluid flow line 22e, the pressurized fluid may flow to the corresponding external venting valve 66 and may be exhausted by the corresponding external venting valve 66 (such as to external atmosphere), which may cause deflation of the vehicle tire 20.

Each fluid flow line 22e may fluidly connect the corresponding external venting valve 66 to each corresponding valve 18. For example, each fluid flow line 22e may fluidly connect to the corresponding fluid flow line 22d to fluidly connect to the outlet of the corresponding external venting valve 66.

Each supply valve 64 may be in communication with the controller 16 and fluidly connected to the first inlet/outlet port 60 of the corresponding valve 18 via the corresponding fluid flow lines 22b, 22d. When the system reservoir 36 holds pressurized fluid the pressurized fluid may be provided to the first inlet/outlet port 60 when the corresponding supply valve 64 is open. Providing pressurized fluid to each first inlet/outlet port 60 allows the corresponding vehicle tire 20 to inflate when the valve 18 is in the open state. In an embodiment, more than four supply valves are provided. In another embodiment less than four supply valves are provided.

Each external venting valve 66 may be in communication with the controller 16 and fluidly connected with the first inlet/outlet port 60 of the corresponding valve 18 via the corresponding fluid flow lines 22b, 22d, 22e. The controller 16 may open each external venting valve 66 independently to fluidly connect the corresponding first inlet/outlet port 60 with ambient air. Connecting each first inlet/outlet port 60 with ambient air allows the corresponding vehicle tire 20 to deflate to ambient air when the corresponding valve 18 is in the open state. In an embodiment, more than four vent valves are provided. In another embodiment less than four vent valves are provided.

The supply pressure sensor 68 may be operably connected to each fluid flow line 22c, which may fluidly connect the outlet of the pressure source 12 and the inlet of each supply valve 64. The supply pressure sensor 68 may be in communication with the controller 16 to provide the controller 16 with a reading of the pressure of the pressurized fluid provided by the pressure source 12.

Each inflation/deflation pressure sensor 70 may be operably connected to the corresponding fluid flow line 22d, which may fluidly connect the corresponding first inlet/outlet port 60 with the corresponding supply valve 64 and the corresponding external venting valve 66. The inflation/deflation pressure sensor 70 may be in communication with the controller 16 to provide the controller 16 with a reading of the pressure of fluid flowing between each supply valve 64 and the corresponding valve 18. In an embodiment, more than four inflation/deflation pressure sensors are provided. In another embodiment less than four inflation/deflation pressure sensors are provided.

When the controller opens each supply valve 64 and closes the corresponding external venting valve 66, the pressurized fluid from the pressure source 12 may flow to the corresponding valve 18. Each supply pressure sensor 68 and the corresponding inflation/deflation pressure sensor 70 may provide the pressure readings to the controller 16. The pressure reading of each inflation/deflation pressure sensor 70 may rise to a level equal to the pressure reading of the corresponding supply pressure sensor 68. By way of non-limiting example, when each valve 18 is open and the corresponding vehicle tire 20 is inflated to 20 pounds per square inch gage (psig), the pressure reading of the corresponding pressure sensor 68 and the corresponding inflation/deflation pressure sensor 70 may be 20 psig.

Alternatively, by way of non-limiting example, when each valve 18 is closed and the corresponding vehicle tire 20 is inflated to 15 psig, the pressure reading of the corresponding pressure sensor 68 and the corresponding inflation/deflation pressure sensor 70 may be 20 psig. If a predetermined pressure level of each vehicle tire 20 is 20 psig, for example, the corresponding valve 18 should be opened to allow each vehicle tire 20 to be inflated to 20 psig.

The controller 16 may be configured to determine whether the valve 18 should be opened and to determine whether the vehicle tire 20 should be inflated or deflated. For example, the controller 16 may have an input for a user to select the predetermined pressure level for each vehicle tire 20. The controller 16 may operate the pressure source 12 and the control system 14 to inflate or deflate each vehicle tire 20 to reach the selected predetermined pressure level.

To facilitate inflation and deflation of the vehicle tires 20, the controller 16 may determine the current state of the valves 18. For example, the controller 16 may determine whether each valve 18 is in the closed state, charged state, or the open state based on a history of pressurized fluid provided to the valve 18 at the direction of the controller 16. The controller 16 may store the history in the memory device.

The history stored may include the pressure level of pressurized fluid provided by the pressure source 12, the pressure level of pressurized fluid provided by each supply valve 64, and a time history of each pressure level. The history stored may also include a timeline of operation of the pressure source 12, the supply valve 64, and the external venting valve 66.

For example, each valve 18 may be configured to have a charge pressure threshold at the corresponding first inlet/outlet port 60 that is greater than an opening pressure threshold at the first inlet/outlet port 60. The charge pressure (also known as a "reset pressure" or "initialization pressure") threshold may be greater than the vehicle tire 20 pressure to counter the vehicle tire 20 pressure. The charge pressure may counter any biasing force that biases the valve 18 in the closed state.

Each valve 18 may be configured to transition from the closed state to the charged state in a prescribed charge time period. By way of non-limiting example, the prescribed charge time period may be 0.5 seconds or less when pressurized fluid is provided to the first inlet/outlet port 60. The valve 18 may also be configured to transition from the charged state to the open state in a prescribed period of time. By way of non-limiting example, the valve 18 may be configured to transition from the charged state to the open state in 0.5 seconds or less once pressure begins to lower at the first inlet/outlet port 60.

The valve 18 may be configured to transition from the open state to the closed state in a prescribed period of time open. By way of non-limiting example, the prescribed period of time open may be 30 seconds. In an embodiment, the prescribed period of time open is less than 30 seconds. In another embodiment, the prescribed period of time open is greater than 30 seconds.

The memory device of the controller 16 may include the configurations of each valve 18 and maintain a record of each in action made by the pressure source 12 or the control system 14. In an embodiment, the opening pressure threshold at each first inlet/outlet port may be greater than a maximum desired pressure level of fluid within the vehicle tire. The maximum desired pressure level may be a maximum manufacturer recommended pressure rating of the vehicle tire.

When charging (resetting/initializing) each valve 18, the controller 16 may keep a record of providing the pressurized fluid at or above the charge pressure threshold to the corresponding first inlet/outlet port 60 of each valve 18 for 0.5 seconds or longer. The controller 16 may determine that each valve 18 is in the charged position based on the known pressure provided to each first inlet/outlet port 60 for the prescribed period of time.

When opening the valve 18, the controller 16 may keep a record of lowering the pressure level of the pressurized fluid below the opening pressure threshold at each first inlet/outlet port 60 to allow the corresponding valve 18 to transition from the charged state to the open state. The controller 16 may adjust the fluid flow from the pressure source 12 to adjust the pressure of the pressurized fluid to a pressure below the opening pressure threshold to transition the valve 18 into the open state. The controller 16 may adjust and/or maintain the fluid flow from the pressure source 12 to maintain the pressure of the pressurized fluid at a pressure below the opening pressure threshold to prevent the valve 18 from transitioning to the charged state from the open state.

The controller 16 may determine that each valve 18 is in the open state based on the known pressure at the corresponding inflation/deflation pressure sensor 70 and an amount of time elapsed since pressure level lowered below the opening pressure threshold. Once opened, each valve 18 may close after the prescribed period of time open. The controller 16 may determine whether each valve 18 has closed based on the amount of time elapsed since opening each valve 18 and the pressure values provided by the corresponding inflation/deflation pressure sensor 70 over time.

The controller 16 may determine the pressure level of the fluid within the vehicle tire 20 based on the pressure values provided by the supply pressure sensor 68 and the inflation/deflation pressure sensor 70 over time in relation to the states of the pressure source 12, the supply valve 64, and the external venting valve 66 over time.

Once the pressure level within the vehicle tire 20 is determined, the controller 16 may determine whether the valve 18 should be re-opened to either inflate or deflate the vehicle tire 20 based on a comparison of the selected pressure level for the vehicle tire 20 compared to the pressure level of the vehicle tire 20 determined by the controller 16.

If the determined pressure level is below the selected pressure level, the controller 16 may open the valve 18, the system reservoir 36, and the supply valve 64 to inflate the vehicle tire 20. While the valve 18 is in the open state, the controller 16 may adjust and/or maintain the fluid flow from the pressure source 12 to maintain the pressure of the pressurized fluid at a pressure below the opening pressure threshold and above the determined pressure of fluid within the vehicle tire 20 to inflate the vehicle tire 20.

If the determined pressure level is above the selected pressure level, the controller 16 may open the valve 18 and the corresponding external venting valve 66 to deflate the corresponding vehicle tire 20. While the valve 18 is in the open state, the controller 16 may adjust and/or maintain the fluid flow from the pressure source 12 to maintain the pressure of the pressurized fluid at a pressure below the opening pressure threshold and below the determined pressure of fluid within the vehicle tire 20 to deflate the vehicle tire 20. The controller 16 may keep the valve 18 open or re-open the valve 18 until the pressure of the fluid inside the vehicle tire 20 reaches the selected pressure level. In an embodiment, the controller may keep the keep the valve open or re-open the valve until the pressure of the fluid inside the vehicle tire reaches ambient air pressure.

Fluid pressure levels may vary inside one of the vehicle tires 20 and at the corresponding inflation/deflation pressure sensor 70 as the corresponding valve 18 is repeatedly re-opened to deflate air inside the vehicle tire 20. A spike of pressure above the charge pressure threshold may occur each time the valve 18 is charged (reset/initialized) and a following drop in pressure may indicate the valve 18 is open. By way of non-limiting example, after about 1 second a spike of pressure may charge (reset/initialized) the valve 18. By way of non-limiting example, after about 0.5 seconds, the pressure may drop to allow the valve 18 to open.

The air pressure within the vehicle tire 20 may drop as the air within the vehicle tire 20 vents from the vehicle tire 20. By way of non-limiting example, the air pressure measured by the inflation/deflation pressure sensor 70 may gradually drop with a reference pressure of 0.0 psig as the valve 18 transitions from the opened state to the closed state.

As the vehicle tire 20 deflates, the pressure of the air within the vehicle tire 20 and the pressure of the air measured by the inflation/deflation pressure sensor 70—while the valve 18 is open—may reduce each subsequent re-opening of the valve 18

The pressure measured by the inflation/deflation sensor 70 may correlate with the air pressure within the vehicle tire 20. Thus, a pressure sensor is not needed within the vehicle tire 20 to determine pressure of the air within the vehicle tire 20.

When the vehicle tire 20 is being inflated, the inflation/deflation sensor 70 would measure the same initial spike of air pressure. After lowering the air pressure to the opening pressure threshold, the air pressure measured by the inflation/deflation sensor 70 would increase at an increasing rate as valve 18 closes, until after the prescribed period of time open when the inflation/deflation sensor 70 reaches the pressure of the pressurized air provided by the pressure source 12 (FIG. 1). As the vehicle tire 20 is inflated the pressure within the vehicle tire 20 may gradually increase at a decreasing rate as the valve 18 closes.

Figure 4:
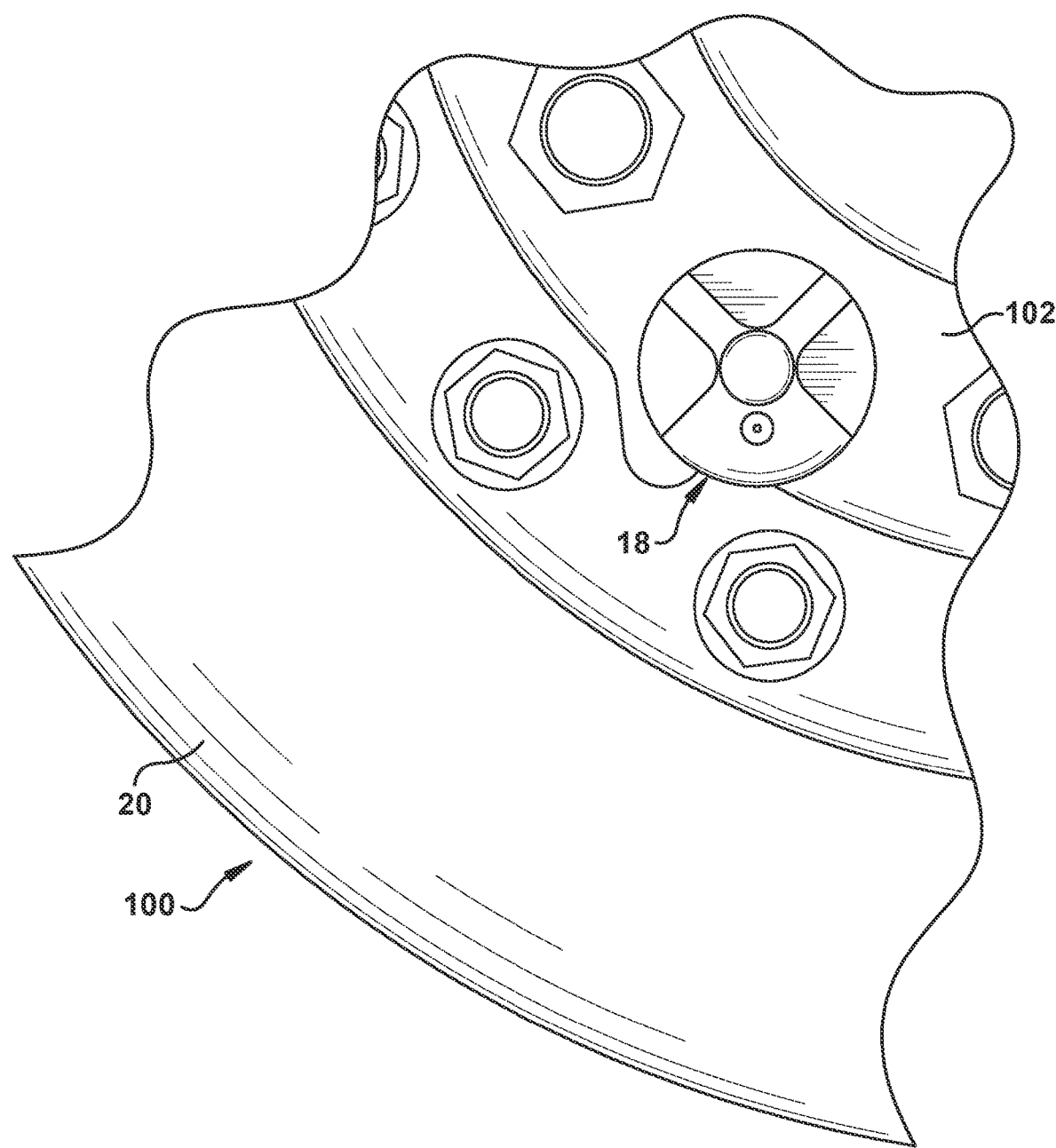
FIG. 4 is a schematic top view of the exemplary wheel valve assembly of FIGS. 2 and 3 assembled within a wheel assembly.

Turning to FIG. 4, a portion of a wheel assembly 100 may include a wheel 102, one of the vehicle tires 20, and the exemplary wheel valve assembly 18 assembled into the wheel 102. As shown, the wheel valve assembly 18 may be placed at a radially outward portion of the wheel 102 that is off-set from a wheel axis (not shown) that the wheel 102 rotates about. In an embodiment, the valve 18 is placed at another location of the wheel 102.

Figure 5A:
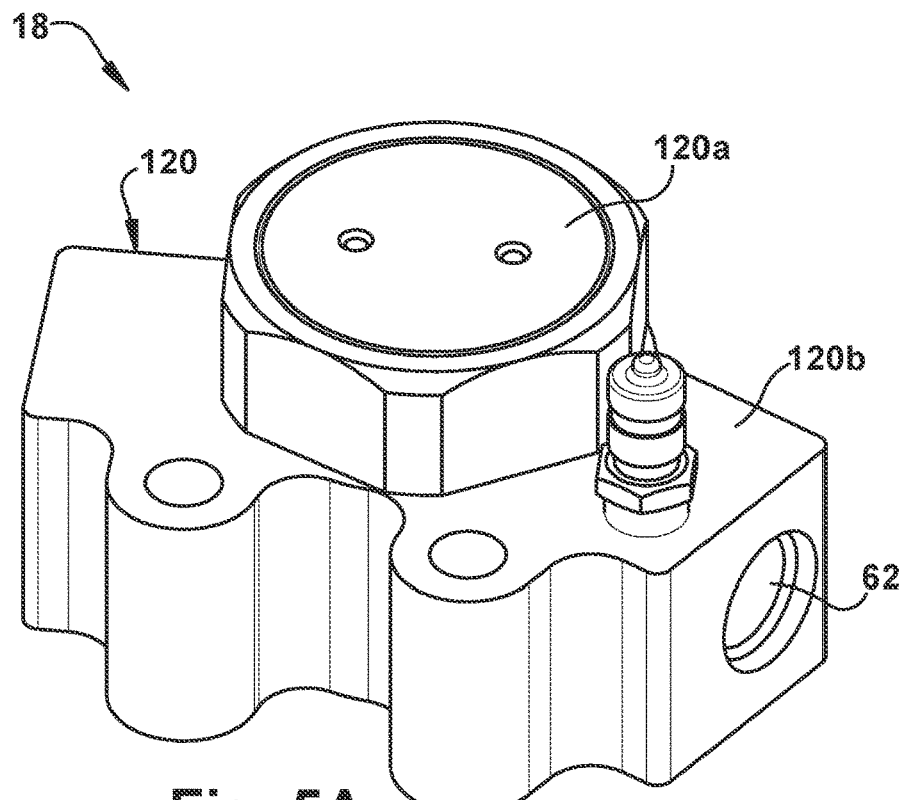
FIG. 5A is a top, side perspective view of the exemplary wheel valve assembly of FIGS. 2 and 3.
Figure 5B:
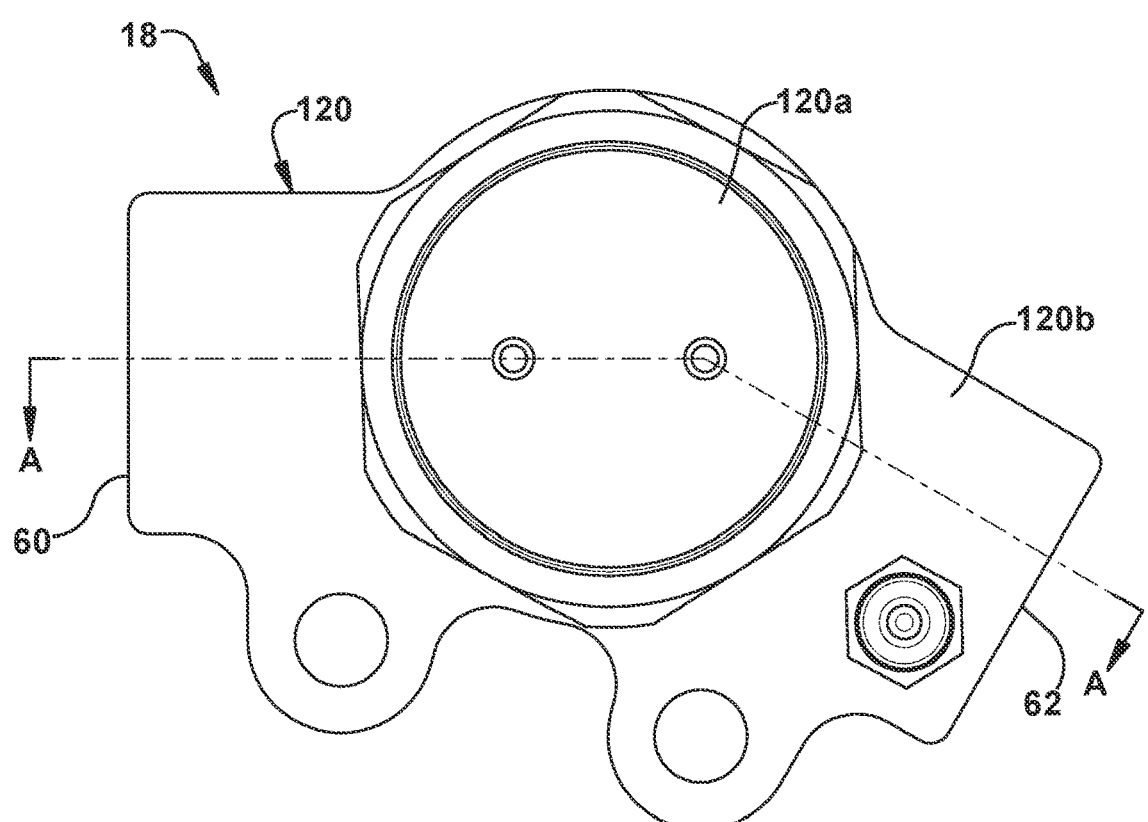
FIG. 5B is a top view of the wheel valve assembly in FIG. 5A.

Referring to FIGS. 5A and 5B outer views of the exemplary wheel valve 18 are shown. As shown, the wheel valve 18 generally includes a valve body 120, which may define the first inlet/outlet port 60 and define a second inlet/outlet port 62. The valve body 120 may be partially formed by two separate housing bodies 120a, 120b that sealingly connect to one another to form an outer housing of the valve body 120. The second inlet/outlet port 62 and the first inlet/outlet port 60 may be formed in the housing body 120b. As shown, the first inlet/outlet port 60 may be cylindrical for receiving a male connector (not shown) of a fluid flow line leading to the control system 14. The second inlet/outlet port 62 may be fluidly connected to the vehicle tire 20. The second inlet/outlet port 62 may be cylindrical for receiving a male connector (not shown) of a fluid flow line leading to the vehicle tire 20.

Figure 6:
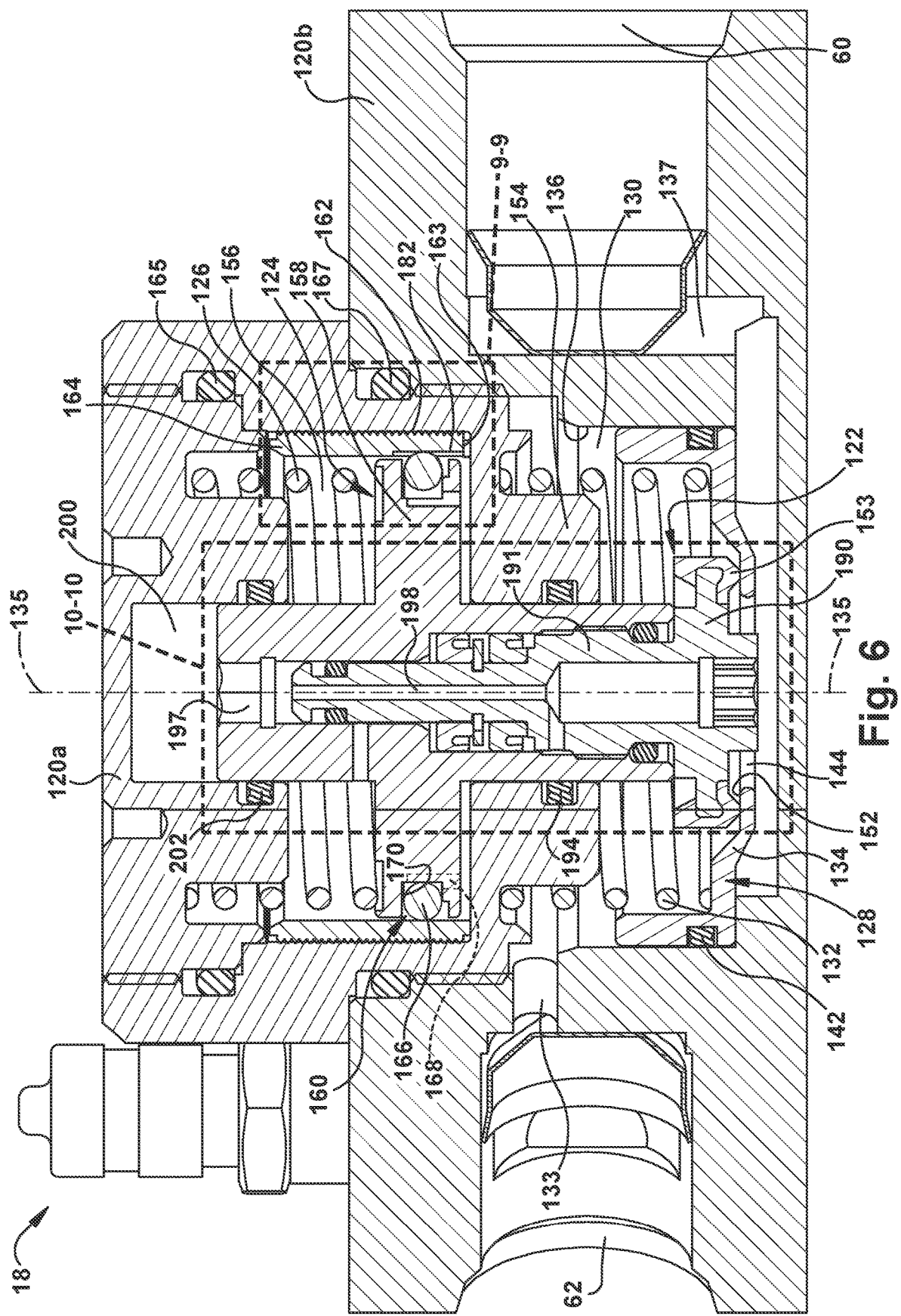
FIG. 6 is a cross-sectional side view of the wheel valve assembly taken about the line A-A in FIG. 5B, which is shown in an exemplary closed state.

Referring to FIG. 6, a cross-sectional view of the exemplary wheel valve assembly 18 is shown. As shown, the wheel valve assembly 18 includes a valve member 122, a fluid-operated damper 124 operably connected to the valve member 122, a timing resilient member 126, a charge member 128 moveable within a primary chamber 130 formed by the valve body 120, and a charge resilient member 132 for biasing the charge member 128.

The charge member 128 (also referred to as a reset member or initialization member) may include a charge piston 134. The charge piston 134 may have a radially outer profile perpendicular to a longitudinal axis 135 that is the same as a radially inner profile of an inner surface 136 of the valve body 120 to allow the charge piston 134 to move axially along the inner surface 136 within the primary chamber 130. The charge piston 134 may be cylindrical and may have a circular radially outer profile that matches the radially inner profile of the inner surface 136.

The charge piston 134 may include a radially outwardly facing groove that secures a sealing member 142, such as a suitable seal, for example a resilient X-ring seal. The sealing member 142 may seal against the charge piston 134 and the inner surface 136 to prevent fluid flow between the inner surface 136 and the piston 134 when the piston 134 is stationary or moving.

The charge piston 134 may include a flow passage 144 for allowing fluid to flow between the first inlet/outlet port 60 and the second inlet/outlet port 62. In the illustrated embodiment, the charge piston 134 is formed with a generally cup shape and the flow passage 144 extends through a bottom center portion of the charge piston 134.

As shown, the charge piston 134 includes a valve seat portion 152 that sealingly engages with a sealing surface 153, such as a suitable seal, at an axial end of the valve member 122 to fluidly disconnect the first inlet/outlet port 60 from the second inlet/outlet port 62.

Figure 7:
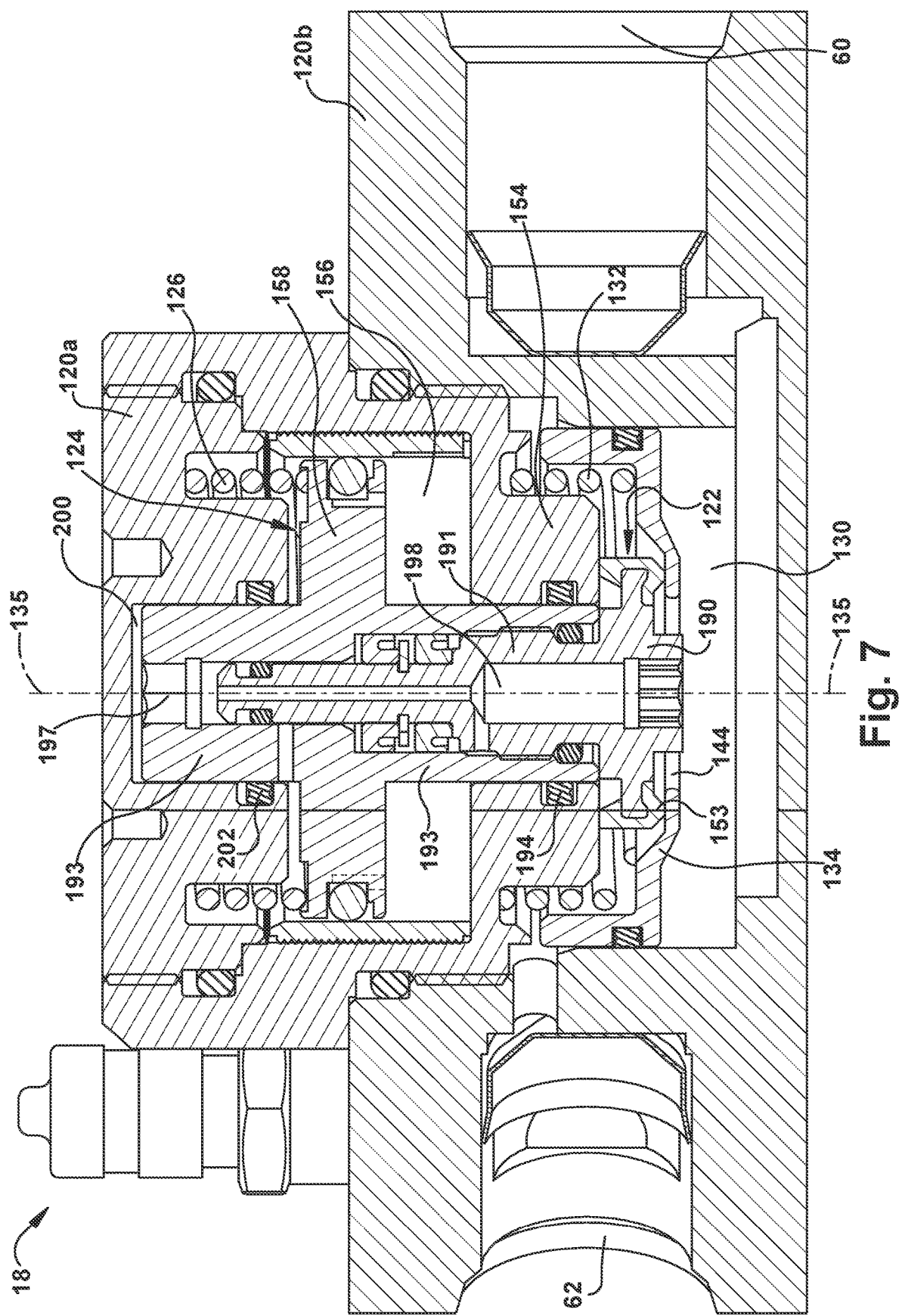
FIG. 7 is a cross-sectional side view of the wheel valve assembly taken about the line A-A in FIG. 5B, which is shown in an exemplary charged state.

The charge piston 134 is axially moveable within the primary chamber 130 (also referred to as the control chamber) to move between its initial position (as shown in FIG. 6) and its charged position (as shown in FIG. 7). As shown in the illustrated embodiment, the charge piston 134 may be axially disposed in a first (e.g., lower) portion of the primary chamber 130 when the charge piston 134 is in the initial position. As shown in FIG. 6, the wheel valve 18 is in a closed state when the charge piston 134 is in its initial position within the first (e.g., lower) portion of the primary chamber 130 while the valve member 122 is in its closed position abutting the charge piston 134 within the primary chamber 130. The charge piston 134 is moveable to the charged position (FIG. 7) and back to its initial position in the first portion of the primary chamber 130. As shown in the comparison between FIG. 6 and FIG. 8, the initial position of the charge piston 134 may correspond with both the closed state (FIG. 6) and open state (FIG. 8) of the wheel valve 18.

The charge resilient member 132 biases the charge member 128 toward its initial position in the first (e.g., lower) portion of the primary chamber 130. Biasing the charge member 128 allows the charge piston 134 to quickly return to its initial position from the charged position when the pressurized fluid provided to the first inlet/outlet port 60 is at or below the opening pressure threshold. The charge resilient member 132 may bias the charge piston 134 in a first axial direction extending from the second (e.g., upper) portion of the primary chamber 130 to the first (e.g., lower) portion of the primary chamber 130. In the illustrated embodiment, the charge resilient member 132 extends from an axially intermediate portion 154 of the valve body 120 to an axially facing surface of the charge piston 134. The charge resilient member 132 may be any type of resilient member or biasing member. For example, the charge resilient member 132 may be a spring, such as a coil spring, for example a metal coil spring.

Referring briefly to FIG. 7, with continued reference to FIG. 6 for comparison, the charge piston 134 may be axially disposed in the second (e.g., upper) portion of the primary chamber 130 when the charge piston 134 is in its charged position. The second (e.g., upper) portion of the primary chamber 130 may be formed at an axially opposite end of the primary chamber 130 as the first (e.g., lower) portion of the primary chamber. When the valve member 122 is in its closed position sealingly engaging the charge piston 134, the charge piston 134 moves the valve member 122 to the second portion of the primary chamber 130 when the charge piston 134 moves from its initial position to the charged position. Providing pressurized fluid at or above the charge pressure threshold may cause the charge piston 134 to move from the initial position to the charged position. While moving, the charge piston 134 moves the valve member 122 to place the valve 18 in the charged state.

Figure 8:
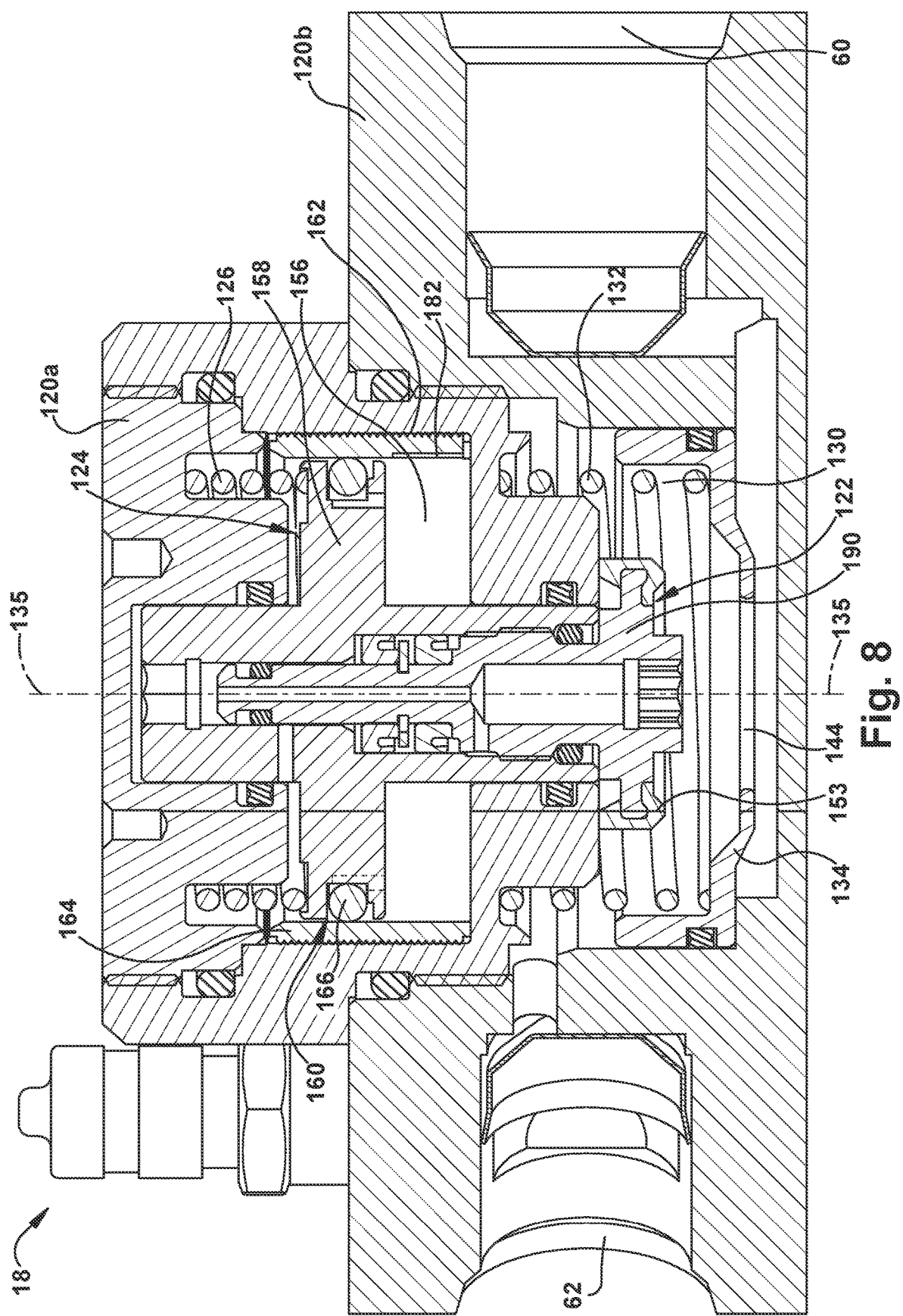
FIG. 8 is a cross-sectional side view of the wheel valve assembly taken about the line A-A in FIG. 5B, which is shown in an exemplary open state.

The valve member 122 is disposed within a fluid flow path of the valve body 120 for fluidly connecting or disconnecting the first inlet/outlet port 60 and the second inlet/outlet port 62. The valve member 122 is in a closed position fluidly disconnecting the flow path between the first inlet/outlet port 60 and second inlet/outlet port 62 when the valve member 122 is sealingly engaged with the charge piston 134 to close the flow passage 144 (as shown in FIGS. 6 and 7, for example). The valve member 122 is in an open position fluidly connecting the flow path between the first inlet/outlet port 60 and second inlet/outlet port 62 when the valve member 122 is disengaged and suitable spaced from the valve seat 152 to open the flow passage 144 (as shown in FIG. 8, for example).

The valve body 120, such as the valve body portion 120b, may include any suitable flow passages for fluidly connecting the first (e.g., control) inlet/outlet port 60 with the second (e.g. tire) inlet/outlet port 62. For example, in the illustrated embodiment, the valve body 120 includes a radial passage 133 fluidly connecting the second inlet/outlet port 62 with an upper portion of the primary (e.g., control) chamber 130, and also includes an axial passage 137 fluidly connecting the first inlet/outlet port 60 with a lower portion of the primary chamber 130. The radial passage 133 may be axially offset from the axial passage 137 to prevent fluid flow from the first inlet/outlet port 60 to the second inlet/outlet port 62 when the charge piston 134 is in the charged position.

The damper 124 is configured to dampen movement of the valve member 122 from its open position (FIG. 8) to the closed position (FIG. 6). Dampening movement of the valve member 122 from the open position to the closed position allows the valve 18 to remain in the open state for the prescribed period of time open.

In the illustrated embodiment, the damper 124 is a fluid-operated damper including a timing fluid chamber 156 and a timing piston 158 moveable within the timing chamber 156. In exemplary embodiments, the damper 124 also includes a check valve 160 for creating a pressure differential within the timing chamber 156, and a restrictive flow passage 162 for delaying pressure equalization within the timing chamber 156, as described in further detail below.

As shown, the timing chamber 156 may be formed by a sleeve 164 disposed within the intermediate portion 154 that circumscribes the central axis 135. The timing chamber 156 may be filled with a fluid, such as air. The timing chamber 156 generally is sealed to contain a prescribed amount of the fluid in the chamber for reliable operation and timing of the valve 18. As discussed in further detail below with exemplary reference to FIG. 10, a vent feature 61 is provided to allow fluid to escape from the timing chamber 156, such as in those circumstances when leakage in the valve allows additional fluid in excess of the prescribed amount to accumulate in the timing chamber 156.

In exemplary embodiments, the timing piston 158 is moveable by a charge force from an initial position at a first (e.g., lower) portion of the timing chamber 156 (as shown in FIG. 6, for example) to a charged position at a second (e.g., upper) portion of the timing chamber 156 (as shown in FIG. 7 or FIG. 8, for example). The timing piston 158 may have a radially outer profile perpendicular to the central axis 135 that is the same as a radially inner profile of the sleeve 164 of the intermediate portion 154 to allow the timing piston 158 to move axially along the inner surface of the sleeve 164 within the timing chamber 156. The timing piston 158 may be cylindrical and may have a circular radially outer profile that matches the radially inner profile of the inner surface of the sleeve 164.

The axially intermediate portion 154 may be fixed to or formed as part of the housing 120, such as the housing bodies 120a, 120b to form an upper end of the primary chamber 130. For example, the axially intermediate portion 154 may have suitable threads to threadingly attach to suitable threads of the housing bodies 120a, 120b. The valve 18 may include seals 165, 167 to restrict fluid leakage out of the valve 18. Each seal 165, 167 may be any suitable seal, such as an elastomeric O-ring.

The check valve 160 may be disposed within the timing piston 158 to prevent fluid flow from the first (e.g., lower) portion of the timing chamber 156 to the second (e.g., upper) portion of the timing chamber 156, and to allow fluid flow from the second portion of the timing chamber 156 to the first portion of the timing chamber 156. The exemplary check valve 160 and its operation are described in further detail below with exemplary reference to FIGS. 9A-9C.

The timing piston 158 is moveable from its charged position (FIG. 7 or FIG. 8) toward its initial position (FIG. 6) with a closing force that allows the valve member 122 to close. The closing force may be greater than the charge force. For example, the closing force may be based on the fluid resistance against the timing piston 158 as the timing piston 158 moves from the charged position to the initial position. The fluid resistance may be much greater when moving the timing piston 158 from the charged position to the initial position compared to the reverse, because fluid pressure may slowly equalize throughout the timing chamber 156 as the timing piston 158 moves.

The charge force may be based on fluid resistance against the timing piston 158 as the timing piston 158 moves from the initial position to the charged position. The fluid resistance may be negligible when moving the timing piston 158 to the charged position compared to the reverse. The fluid pressure may equalize throughout the timing chamber 156 more quickly as the timing piston 158 moves to the charged position compared to moving to the initial position.

The timing resilient member 126 may bias the valve member 122, the timing piston 158, and the charge piston 134 in the first axial direction to bias the valve 18 in the closed state. The timing resilient member 126 may be any type of resilient member or biasing member. For example, the timing resilient member 126 may be a spring, such as a coil spring, for example a metal coil spring. In the illustrated embodiment, the timing resilient member 126 is disposed within the timing chamber to circumscribe the axis 135 and engages an inner surface of the valve body portion 120a and an upper portion of the timing piston 158.

The timing resilient member 126 may move the timing piston 158 from the charged position (FIG. 7 or FIG. 8) to the initial position (FIG. 6). When moving the timing piston 158 from the charged position to the initial position fluid may be forced through the restrictive flow passage 162 until the timing piston 158 approaches the first portion of the timing chamber 156. The restrictive flow passage 162 may restrict fluid flow from the first (e.g., lower) portion of the timing chamber 156 to the second (e.g., upper) portion of the timing chamber 156 to delay pressure equalization between the first portion and the second portion.

In exemplary embodiments, the restrictive flow passage 162 is formed as a helical passage 162. In the illustrated embodiment, the helical passage 162 spirals about the longitudinal axis 135 in an axial direction parallel to the longitudinal axis 135. As shown, the helical passage 162 may be formed between a radially outer surface of the sleeve 164 and a radially inner surface of the intermediate portion 154. For example, the helical passage 162 may be formed with a helical groove in the radially outer surface of the sleeve 164. Such a helical groove provides a relatively simple and inexpensive way to provide the restrictive flow passage 162. As shown, the restrictive flow passage 162 may be fluidly connected to the timing chamber 156 via a radial flow passage 163, which may be formed at an end of or through the sleeve 164.

In exemplary embodiments, the valve 18 may include a quick close port 182 to reduce a fluid pressure differential between the first (e.g., lower) portion and the second (e.g., upper) portion of the timing chamber 156 as the timing piston 158 reaches an end of its stroke while moving from the charged position (FIG. 7 or FIG. 8) to the initial position (FIG. 6). The quick close port 182 may fluidly connect the first portion to the second portion of the timing chamber 156. For example, the quick close port 182 may allow fluid to flow in an axial direction from the first portion of the timing chamber to the second portion of the timing chamber.

In the illustrated embodiment, for example, the quick close port 182 includes a radially outwardly recessed portion (also referred to with reference number 182) in the inner surface of the sleeve 164. As shown, the recessed portion 182 extends in an axial direction along only a portion of the inner surface of the sleeve 164. The recessed portion 182 may extend in the axial direction from the lower axial end of the sleeve 164 to allow fluid to flow through the recessed portion 182 past the timing piston 158 as the timing piston 158 is anywhere from 5% to 20% away from the end of its stroke as it travels upward. For example, the axial length of the recessed portion 182 may be configured to allow fluid to flow through the radially outwardly recessed portion 182 past the timing piston 158 when the timing piston 158 has reached an axial position that would indicate 10% of time remaining for the timing piston 158 to reach the end of its stroke without the quick close port 182. As shown, when the timing piston 158 moves from the charged position (FIG. 7 or FIG. 8) to the initial position (FIG. 6), a radially outward portion of the sealing member 166 disengages from the inner surface of the sleeve 164 at the radially outwardly recessed portion 182 to allow fluid to flow through the radially outwardly recessed portion 182. Allowing fluid flow quickens pressure equalization between the first portion and the second portion of the timing chamber 156 to reduce resistance to movement of the timing piston in the first axial direction.

Referring particularly to FIG. 7, the wheel valve 18 is illustrated in the exemplary charged state where the charge piston 134 has moved into its charged position and has moved the valve member 122 upwardly along with the charge piston 134. Providing fluid with a fluid pressure at or above the charge pressure threshold at the first inlet/outlet port 60 may transition the valve member 122 and the charge piston 134 into their respective illustrated positions. In the illustrated state, the valve member 122 is still closing the flow passage 144 by providing sealing engagement of the sealing surface 153 with the valve seat 152.

The valve member 122 may include a poppet 190 and the sealing surface 153 at an axial end of the poppet 190 for sealing against the charge piston 134. In an embodiment, the valve member is another type of valve, for example a sliding valve. As shown, the valve member 122 may include a valve stem portion 191 (or tube) forming a body that extends axially along the central axis 135. In the illustrated embodiment, valve stem portion 191 is fixed within a timing stem portion 193 (or tube) forming a longitudinally extending body that is operably coupled to the timing piston 158. The valve stem portion 191 may be fixed for common axial movement with the timing stem portion 193 via a suitable thread or other any other fastener. In exemplary embodiments, the head of the poppet 190 is unitary with the valve stem portion 191 and/or the timing piston 158 is unitary with the timing stem portion 193. Alternatively or additionally, the timing stem portion 193 may be unitary with the valve stem portion 191.

As shown in the illustrated embodiment, the timing stem portion 193 and valve stem portion 191 are axially movable through a central through-hole in the intermediate portion 154, such that movement of the respective stem portions 191, 193 enables the timing piston 158 and the head of poppet 190 to move axially together. To maintain suitable sealing between the primary (e.g., control) chamber 130 and the timing chamber 156, a seal 194 is provided in a seal groove of the intermediate portion 154 to engage with the radially outer surface of the timing stem portion 193 that extends through the through-hole in the intermediate portion 154. The seal 194 may be any suitable seal, such as an X-ring seal, for example.

In exemplary embodiments, the timing stem portion 193 includes an internal axial flow passage 197 that is fluidly connected to an internal axial flow passage 198 of the valve stem portion 191. As shown, the respective internal axial flow passages 197, 198 fluidly connect a variable volume chamber 200 (shown best in FIG. 6) with the primary chamber 130 which may be in fluid communication with the first (e.g., control) inlet/outlet port 60. The variable volume chamber 200 may have a minimum volume when the valve member 122 is in the charged position (as shown in FIG. 7), and may have a maximum volume that is larger than the minimum volume when the valve member 122 is in its initial position (as shown in FIG. 6). Fluid contained within the variable chamber 200 may flow through the internal axial flow passages 197 and 198 to the primary chamber 130 to prevent fluid pressure build-up that may resist opening of the valve member 122. As shown, the variable volume chamber 200 may be fluidly disconnected from the timing chamber 156 by a seal 202 that engages with an upper portion of the timing stem portion 193. The seal 202 may be any suitable seal, such as an X-ring seal.

As mentioned above, the seal 153 at an axial end portion of the valve member 122 is configured to sealingly engage with the valve seat portion 152 of the charge piston 134 to seal against the charge piston 134 and prevent fluid flow therebetween. Preventing fluid flow between the charge piston 134 and the seal 153 may fluidly disconnect the first inlet/outlet port 60 and the second inlet/outlet port 62. For example, the fluid flow from the first inlet/outlet port 60 through the primary chamber 130 to either second inlet/outlet port 62 may be prevented.

Turning to FIG. 8, the wheel valve 18 is illustrated in the exemplary open state. When the valve 18 is in the charged state (FIG. 7), reducing the fluid pressure at or below the opening pressure threshold at the first inlet/outlet port 60 may transition the valve 18 toward the open state. When the valve 18 is in the open state, the seal 153 may be axially spaced from the charge piston 134 to allow fluid to flow between the poppet 190 and the charge piston 134 via passage 144. The poppet 190 may be in an open position and the charge piston 134 may be in an open position to allow fluid to flow from the first inlet/outlet port 60 to each second inlet/outlet port 62.

The timing piston 158 is configured to dampen movement of the valve member 122 (e.g., poppet 190) from the open position (FIG. 8) to the closed position (FIG. 6). For example, the timing resilient member 126 may bias the poppet 190 to close while the fluid in the first (e.g., lower) portion of the timing chamber 156 increases in pressure relative to the fluid in the second (e.g., upper) portion of the timing chamber 156. The fluid in the first portion may force the check valve 160 to prevent fluid flow. The increased pressure of the fluid in the first (e.g., lower) portion of chamber 156 may cause the sealing member 166 to seal against the inner surface of the sleeve 164 to prevent fluid flow therebetween. Fluid from the first (e.g., lower) portion of the timing chamber 156 may only be able to equalize pressure with the fluid in the second (e.g., upper) portion of the timing chamber 156 by flowing through the restrictive flow passage 162 until the timing piston 158 reaches the quick close port 182. Restricting the fluid flow may delay closure of the poppet 190 to allow fluid to flow through the primary chamber 130 between the first inlet/outlet port 60 and each second inlet/outlet port 62.

The delayed closure may allow the poppet 190 to remain axially spaced from the charge piston 134 for the prescribed period of time open. By way of example and not limitation, the prescribed period of time open may be anywhere from 10-60 seconds, more particularly 20-40 seconds, and more particularly 30 seconds. In an embodiment, the prescribed period of time open may be based on a size of the vehicle tire, a desired pressure of the vehicle tire, and desired deflation rates of the vehicle tire.

Pressure at the second inlet/outlet port 62 may be reduced below the opening pressure threshold. For example, the pressure provided to the first inlet/outlet port 60 may be lowered, or completely removed, and the poppet 190 may remain axially spaced apart from the charge piston 134 for the prescribed period of time open. While the poppet 190 is axially spaced from the charge piston 134, fluid may flow from the second inlet/outlet port 62 to the first inlet/outlet port 60.

The fluid pressure at the second inlet/outlet port 62 may reduce toward ambient pressure by expelling fluid from the second inlet/outlet port 62 to the first inlet/outlet port 60. For example, the first inlet/outlet port 60 may be fluidly connected to ambient air, such as when the corresponding external venting valve 66 (FIG. 1) is open.

The poppet 190 may remain axially spaced from the charge piston 134 during the prescribed period of time open when the pressure at the first inlet/outlet port 60 is equal to ambient pressure. The fluid pressure at the second inlet/outlet port 62 may be reduced to ambient pressure when the first inlet/outlet port 60 is at ambient pressure and the valve 18 is opened. For example, ambient pressure may be 0.0 psig and the poppet 190 may remain axially spaced from the charge piston 134 for the prescribed period of time open.

When the damper 124 times out and moves to its end stroke position at the first (e.g., lower) portion of the timing chamber 156, the poppet 190 moves axially corresponding with movement of the timing piston 158 to seal against the charge piston 134 via seal 153, thereby closing the valve (as shown in FIG. 6).

Figure 9A:
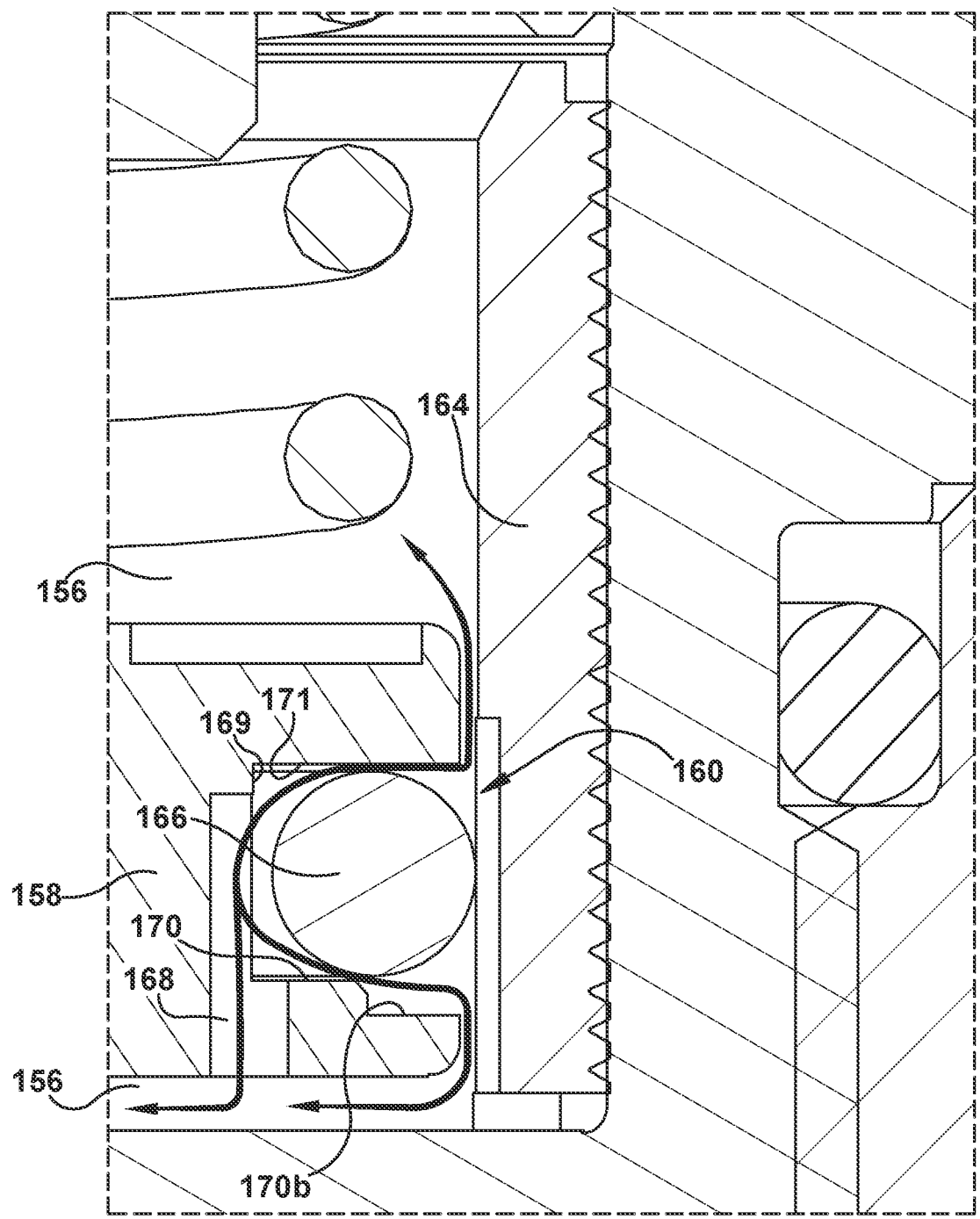
FIG. 9A is an enlarged cross-sectional side view of the region 9-9 in FIG. 6 showing an exemplary check valve feature according to an embodiment of the present disclosure, shown when an exemplary timing piston is in an exemplary initial state.
Figure 9B:
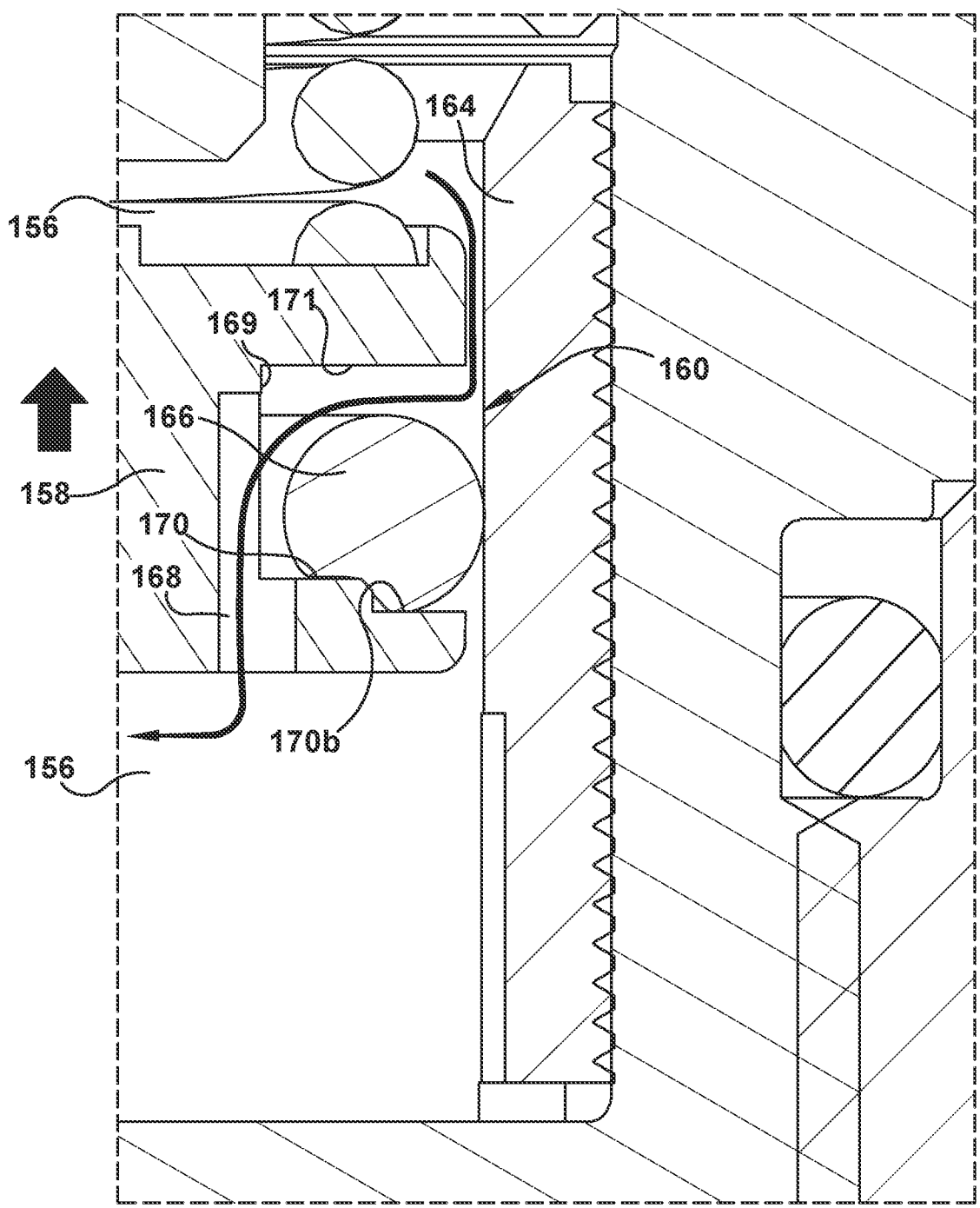
FIG. 9B is an enlarged cross-sectional side view showing the exemplary check valve feature in FIG. 9A when the timing piston is moving from its initial state toward an exemplary charged state.
Figure 9C:
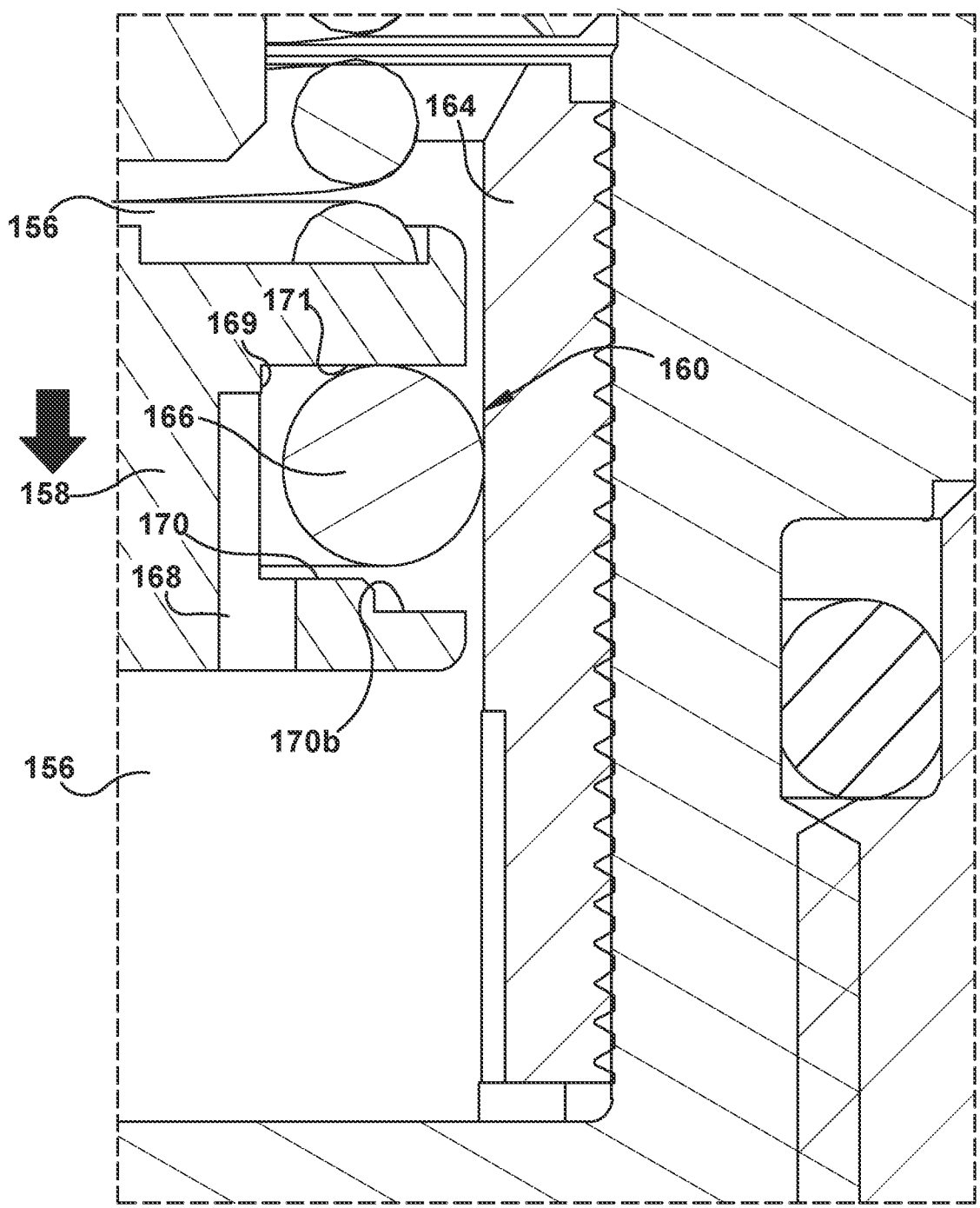
FIG. 9C is an enlarged cross-sectional side view showing the exemplary check valve feature in FIGS. 9A and 9B when the timing piston is moving from its charged state back toward its initial state.

Referring to FIGS. 9A-9C, the exemplary check valve 160 between the first (e.g., lower) portion of the timing chamber 156 and the second (e.g., upper) portion of the timing chamber 156 will now be described in further detail. As briefly described above, the check valve 160 may be disposed within the timing piston 158 to prevent fluid flow from the first (e.g., lower) portion of the timing chamber 156 to the second (e.g., upper) portion of the timing chamber 156, and to allow fluid flow from the second portion of the timing chamber 156 to the first portion of the timing chamber 156. In the illustrated embodiment, the check valve 160 includes a sealing member 166 and one or more fluid passages 168. The sealing member 166 may be disposed in a radially outward facing groove 169 of the timing piston 158 for abutting the inner surface of the sleeve 164 of the axially intermediate portion 154. Fluid flow through each fluid passage 168 may be prevented when the sealing member 166 is engaged with the inner surface of the sleeve 164 and the timing piston 158. For example, the sealing member 166 may be any suitable seal, such as an O-ring seal 166, and the O-ring seal 166 may engage with the inner surface of the sleeve 164. The O-ring seal 166 may shift within the groove 169 to engage with axial facing surfaces of the timing piston 158 when the timing piston 158 moves between its charged position (FIG. 7) and its initial position (FIG. 6), as discussed below.

The one or more fluid passages 168 may be any suitable passage or combination of passages for permitting or restricting fluid flow between the first (e.g., lower) and second (e.g. upper) portion of the timing chamber 156. For example, at least a portion of the fluid passage 168 may extend to a radially outward facing surface of the timing piston 158 to allow the sealing member 166 to recede radially inwardly into each fluid passage 168. In an embodiment, the fluid passage 168 may extend axially through the timing piston 158 and the sealing member may seal the fluid passage when the timing piston moves in the first axial direction.

As shown in FIG. 9A, when the valve 18 is in the exemplary closed state (corresponding with FIG. 6), the sealing member 160 is centered in the groove 169 of the timing piston 158 such that a fluid seal is not made between the first (e.g., lower) and second (e.g., upper) portion of the timing chamber 156. As such, fluid exchange is permitted between the volumes above and below the timing piston 158.

As shown in FIG. 9B, when the valve 18 is moved from its closed state (corresponding with FIG. 6) to its charged state (corresponding with FIG. 7), the timing piston 158 moves upwardly in the timing chamber 156. The seal member 166 is then shifted toward the bottom of the groove 169 to sealingly engage with a lower axially facing surface 170 of the groove 169. The position of the seal member 166 is such that the flow passage 168 remains open to fluid flow from the second (e.g., upper) portion of the timing chamber 156 to the first (e.g., lower) portion of the timing chamber 156.

As shown in FIG. 9C, when the valve 18 is moved from its charged state (e.g., corresponding with FIG. 8) back to its initial state where the valve is closed (corresponding to FIG. 6), the timing piston 158 moves downwardly in the timing chamber 156. The seal member 166 is then shifted toward the top of the groove 169 to sealingly engage with an upper axially facing surface 171 of the groove 169. The position of the seal member 166 is such that the flow passage 168 is closed to fluid flow from the first (e.g., lower) portion of the timing chamber 156 to the second (e.g., upper) portion of the timing chamber 156. As described above, when moving the timing piston 158 from the charged position to the initial position fluid is forced through the restrictive flow passage 162 until the timing piston 158 approaches the first (e.g., lower) portion of the timing chamber 156. The restrictive flow passage 162 may restrict fluid flow from the first (e.g., lower) portion of the timing chamber 156 to the second (e.g., upper) portion of the timing chamber 156 to delay pressure equalization between the first portion and the second portion.

In exemplary embodiments, the axial face 170 of the groove 169 includes a stepped surface, including axially offset stepped portion 170b. The stepped portion 170b minimizes the contact area of the sealing member 166 to minimize friction forces and sticking of the seal member 166 at the lower portion of the groove 169. This enables the seal member 166 to move more freely in the groove 169.

Figure 10:
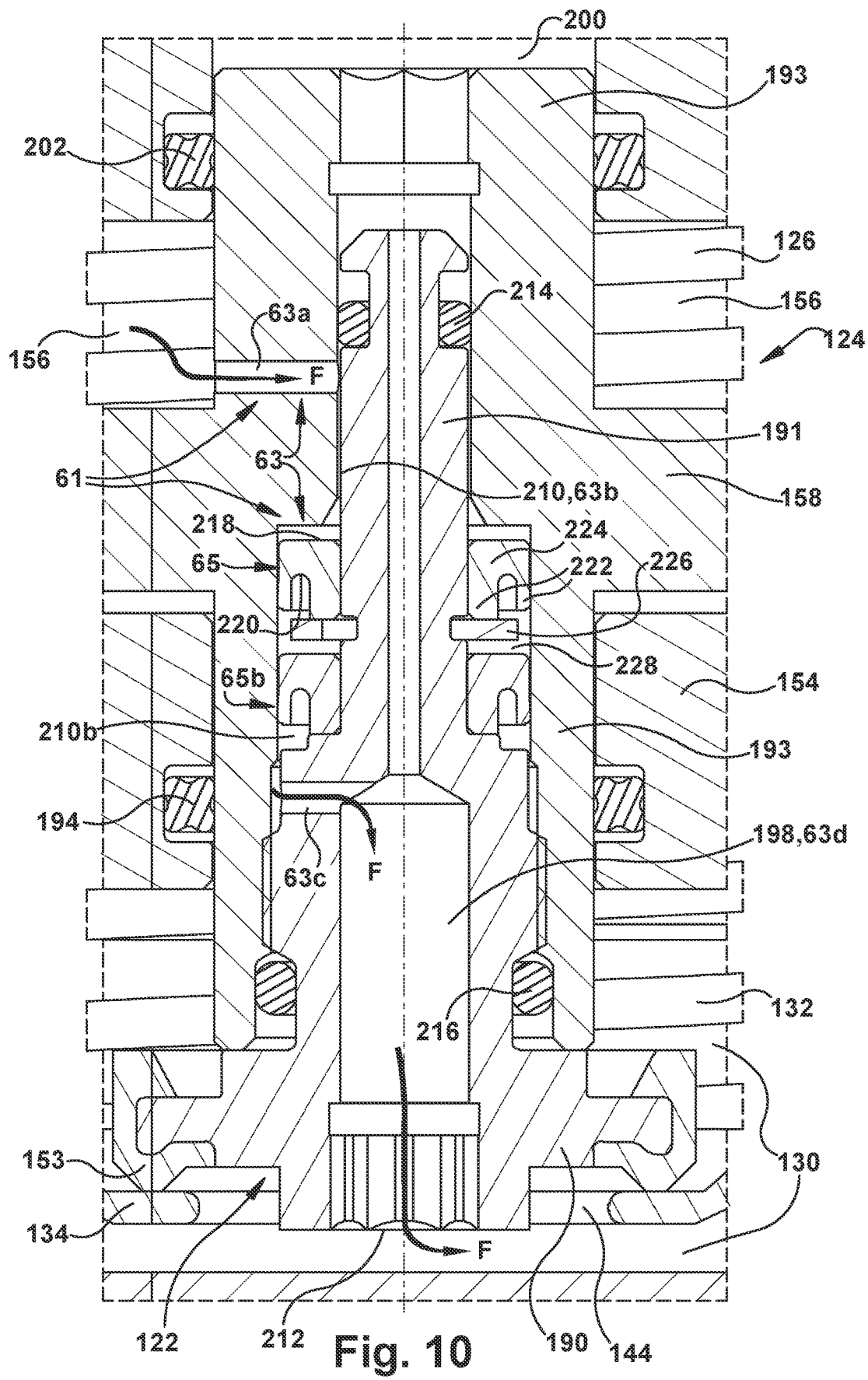
FIG. 10 is an enlarged cross-sectional side view of the region 10-10 in FIG. 6 showing an exemplary vent feature according to an embodiment of the present disclosure.

Referring now particularly to FIG. 10, the exemplary vent feature 61 of the wheel valve assembly 18 will now be described in further detail.

Generally, to maintain the desired timing of the valve 18 via the damper 124, the fluid (e.g., air) within the timing chamber 156 is sealed therein to maintain a suitable pressure level range. One issue that can occur with the wheel valve assembly 18 over the course of its life, however, is that leakage of fluid (e.g., air) may find its way into the timing chamber 156, which can impact the reliable timing and control of the valve 18. For example, the dynamic seals 194 and/or 202 may permit fluid from the primary chamber 130 and/or variable volume chamber 200 to leak into the timing chamber 156. Other avenues of leakage into the timing chamber 156 include those from another pressurized source, such as pressure applied to the control line through seal 214, for example. By way of non-limiting example, leakage of such fluid into the timing chamber 156 resulting in an increased pressure of 60 psi may result in the timing of the damper 124 being 5 seconds longer than desired. Other factors also may affect the pressure level in the timing chamber, such as variations in temperature, pressure, or inherent manufacturing issues.

As shown in the illustrated embodiment, the exemplary vent feature 61 provides a vent passage 63 fluidly connected to the timing chamber 156 and at least one vent valve 65 that is configured to open or close the vent passage 63. When the vent valve 65 is activated to open the vent passage, fluid in the timing chamber 156 is permitted to escape, thereby maintaining the desired pressure level in the timing chamber 156. Allowing the excess fluid pressure within the timing chamber 156 to escape via the exemplary vent feature 61 thereby maintains the timing of the valve member 122 within a suitable range according to the design parameters of the wheel valve assembly 18.

The vent passage 63 may include any suitable passage or combination of passages that permits venting of excess fluid or excess fluid pressure from the timing chamber 156. In exemplary embodiments, the vent feature 61 provides internal venting to fluidly connect the timing chamber 156 back to the primary (e.g., control) chamber 130 which is fluidly connected to the first (e.g., control) inlet/outlet port 60. For example, the timing chamber 156 may be fluidly connected with the primary chamber 130 via the internal axial flow passage 198 extending through the valve stem portion 191 of the valve member 122. It is understood, however, that other suitable flow paths for the vent passage(s) may be provided, which may extend through other suitable components or be ported to other fluid channels, as would be understood by those having ordinary skill in the art.

With exemplary reference to the fluid flow lines, F, shown in the illustrated embodiment, the vent passage 63 may include a first vent passage portion 63a that extends radially through an upper portion of the timing stem portion 193. The first vent passage portion 63a may open through a radially outer side of the timing stem portion 193 into the timing chamber 156 above the timing piston 158 to fluidly connect with the second (e.g., upper) portion of the timing chamber 156. The first vent passage portion 63a also may open through the opposite radially inward side of the timing stem portion 193 into a gap 210 between the timing stem portion 193 and the valve stem portion 191.

The gap 210 forms an axial (second) vent passage portion 63b. As shown, the gap 210 between the timing stem portion 193 and valve stem portion 191 may widen at an axially intermediate widened gap portion 210*a* to permit insertion of the at least one valve member 65 in the fluid flow path of the vent passage 63.

In the illustrate embodiment, a third vent passage portion 63*c* extends radially through the valve stem portion 191 to fluidly connect the second (axial) vent passage portion 63*b* with the axial internal passage 198 of the valve stem portion 191. The axial internal flow passage 198 forms a fourth vent passage portion 63*d* that is fluidly connected to the primary chamber 130 via an opening 212 through the head portion of the valve member 122, which permits fluid to flow to the first inlet/outlet port 60.

As shown, one or more suitable seals 214, 216, such as O-ring seals, may be provided to seal the gap 210 (e.g., second vent passage portion 63*b*) between the timing stem portion 193 and valve stem portion 191 to urge the fluid through the flow path described above.

The at least one vent valve 65 may be any suitable valve or combination of valves provided at any suitable location(s) in the flow path of the vent passage 63 to permit or restrict fluid flow out of the timing chamber 156.

In the illustrated embodiment, for example, the at least one vent valve 65 is disposed in the second (axial) vent passage portion 63*b* formed by the gap 210 between the valve stem portion 191 and timing stem portion 193, such as in the widened gap portion 210*b*. As shown, the vent valve 65 is located at an axial position that is between the axially offset first (radial) vent passage portion 63*a* and third (radial) vent passage portion 63*c* to permit or restrict flow between these passages 63*a*, 63*b*.

In exemplary embodiments, the at least one vent valve 65 includes at least one check valve (also referred to with reference numeral 65) that is configured to activate to open in response to a pressure differential acting on its opposite upstream and downstream sides 218, 220. For example, when the system is at rest with no or reduced pressure in the primary chamber 130 of the valve 18 (e.g., no or reduced pressure at the first inlet/outlet port 60), a pressure differential is created between the timing chamber 156 and the primary chamber 130. In the illustrated embodiment, this pressure differential is communicated via the first (radial) vent passage portion 63*a* fluidly connected to the timing chamber 156 and the third (radial) vent passage portion 63*c* fluidly connected to the primary chamber 130. This pressure differential is communicated to the at least one valve member 65 via the gap 210 (e.g., second flow passage 63*b*), and acts on the opposite upstream and downstream sides 218, 220 of the check valve 65. The check valve 65 is activated to open the flow path when the pressure on its upstream side 218 (e.g., timing chamber pressure) is greater than the pressure on its downstream side 220 (e.g., primary chamber pressure). The pressure differential for activating the check valve 65 to open may be set to a specified level based on the configuration of the valve, as understood by those having ordinary skill in the art. In the illustrated embodiment, the check valve 65 is a one-way check valve that permits fluid flow only out of the timing chamber 156.

The check valve functionality of the at least one vent valve 65 may be provided by any suitable check valve assembly or check valve element(s) (collectively referred to herein simply as the check valve 65). For example, the exemplary check valve 65 may include a resilient lip seal, such as a U-cup seal, a duck-bill seal, or the like; a spring-loaded check valve, such as a spring-loaded ball assembly; or other suitable forms of check valve (e.g., one-way check valve), as would be understood by those having ordinary skill in the art. The exemplary check valve 65 may consist of only a single check valve element, such as with an exemplary lip seal, or may include a plurality of components, such as with a spring-loaded check valve.

In exemplary embodiments, the at least one vent valve (e.g., check valve) is formed by a fluid pressure-energized valve element 65 that is made with a resilient material (also referred to herein as a resilient fluid pressure-energized valve element, or fluid-energized valve element). Unlike a spring-loaded ball check valve which primarily is energized by spring force, the resilient fluid-energized valve element primarily is energized in response to fluid pressure acting on the valve element. Such a resilient fluid-energized valve element can therefore provide a relatively simplified construction and may improve the reliability of the valve 18. Also due to the scale of the particular application, many ball-and-spring or poppet check valve designs may have a smaller sealing surface area which may make them more susceptible to contamination-based leakage.

In exemplary embodiments, the resilient fluid-energized valve element 65 may be a resilient seal having one or more lips which act to sealingly engage against one or more surfaces when fluid pressure is exerted on a first side of the seal that is greater than the opposite second side, and which act to disengage and unseal from the one or more surfaces when fluid pressure on the second side is greater than the first side. The resilient fluid-energized valve element 65 may be specifically configured to activate to open when the fluid pressure differential is greater than a prescribed amount.

The exemplary fluid-energized valve element 65 may be with any suitable resilient material or combination of materials. For example, the resilient material may be selected from a suitable polymeric material, such as nitrile, silicone, polyurethane, neoprene, ethylene-propylene, or combinations thereof; or may include other materials, such as filler materials.

In the illustrated embodiment, the vent valve 65 is a single component in the form of a U-cup seal 65 made with a resilient material. In the illustrated embodiment, the resilient material is urethane, such as polyurethane, for example. The U-cup seal 65 is in the form of a ring and includes two radially spaced apart lip portions 222 that project axially from a bridging portion, or base 224. As shown, the U-cup seal 65 is located in the widened gap portion 210*b* between the valve stem portion 191 and timing stem portion 193 (e.g., second (axial) vent passage portion 63*b*) and is oriented with its base 224 toward the upstream first (radial) vent passage 63*a*, and with its lips 222 toward the downstream third (radial) vent passage 63*c*. The U-cup seal 65 may be held in place within the widened gap portion 210*b* by a retaining ring 226, or any other suitable holder, such as groove or shoulder of a component of the valve 18, for example.

An exemplary operation of the U-cup seal 65 as a check valve element will now be described. When fluid pressure exerted against the downstream side of the lips 222 of the U-cup seal 65 (communicated from the primary chamber 130) is greater than the fluid pressure exerted against the upstream side of the lips 222 (communicated from timing chamber 156), the lips 222 will be urged away from each other to enhance sealing against the corresponding sealing surfaces of the valve stem portion 191 and timing stem portion 193, thereby preventing flow from the primary chamber 130 to the timing chamber 156. On the other hand, when fluid pressure exerted against the upstream side of the lips 222 (communicated from the timing chamber 156) is greater than the fluid pressure exerted against the downstream side of the lips 222 (communicated from the primary chamber 130), the lips will be urged toward each other to disengage and unseal from the corresponding sealing surfaces of the valve stem portion 191 and timing stem portion 193, thereby opening the flow path from the timing chamber 156 to the primary chamber 130. By way of non-limiting example, the U-cup seal 65 (e.g., check valve 65) may be configured to activate to open (e.g., unseal the lips) when the pressure on the upstream side (communicated from the timing chamber 156) is about 25 psi or greater than the downstream side (communicated from the primary chamber 130).

One possible effect of providing the vent feature 61 in the wheel valve assembly 18 is that contaminants, such as dirt, sand, salt, water, snow, or other such contaminants ingested into the flow path of the tire inflation/deflation system 10, could migrate to the timing chamber 156 by bypassing the vent valve 65. To mitigate such contamination, exemplary embodiments of the wheel valve assembly 18 provide a multiple-redundant configuration of vent valves, such as two or more vent valves 65. The multiple vent valves may be configured to provide a suitable isolation gap between the vent valves which serves as an airlock-type feature for trapping contaminants.

In the illustrated embodiment, for example, the vent valve 65 is a first vent valve, and the vent feature 61 further includes a second vent valve 65b that is spaced apart from the first vent valve 65 in the fluid passage 63b to form an isolation gap 228 therebetween. In exemplary embodiments, the first vent valve 65 and the second vent valve 65b may have the same configuration, or the configurations may be different to provide different activation pressures for the valves 65, 65b.

In the illustrated embodiment, both vent valves 65, 65b are formed as U-cup seals having one-way check valve functionality, as described above. When fluid pressure from the timing chamber 156 is greater than fluid pressure in the isolation gap 228 by a specified amount, the first vent valve 65 (e.g., U-cup check valve) will be activated to open and vent into the isolation gap 228. When fluid pressure in the isolation gap 228 is greater than fluid pressure from the primary chamber 130 by a specified amount, the second vent valve 65b (e.g., U-cup check valve) will be activated to open to vent from the isolation gap 228 to the primary chamber 130.

Figure 11:
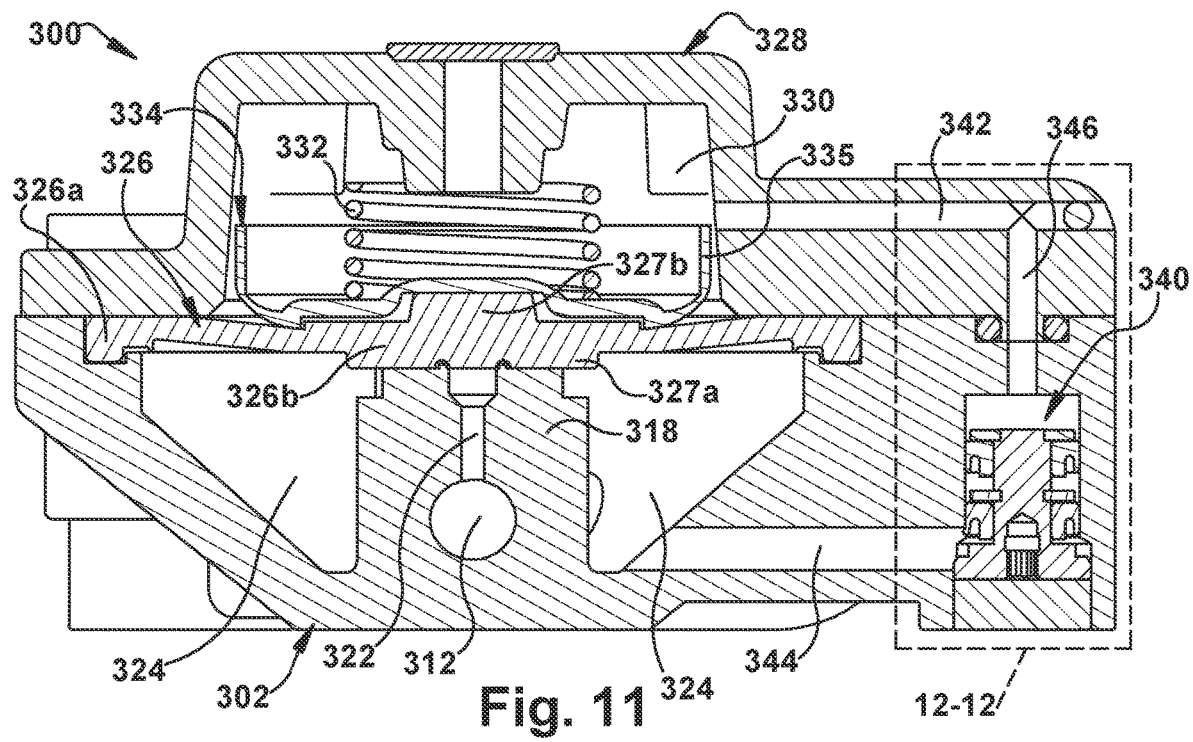
FIG. 11 is a cross-sectional side view of another wheel valve assembly according to an embodiment of the present disclosure.
Figure 12:
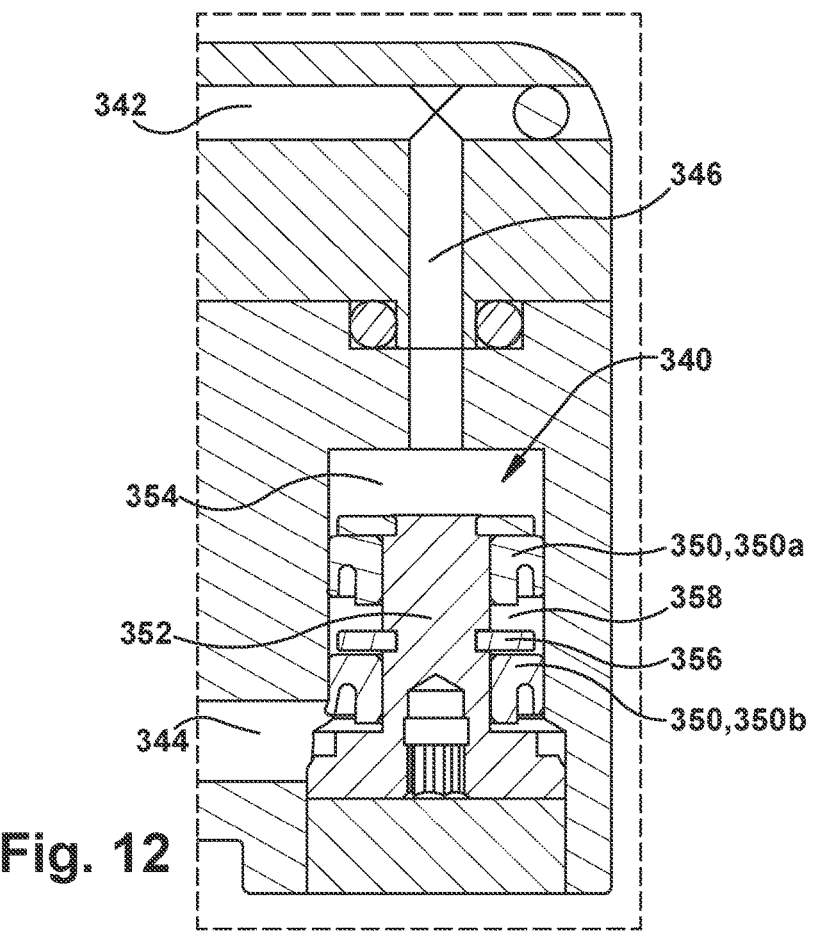
FIG. 12 is an enlarged cross-sectional side view of the region 12-12 in FIG. 11 showing an exemplary valve element configuration according to an embodiment of the present disclosure.

Turning to FIGS. 11 and 12, another exemplary embodiment of a wheel valve assembly 300 for a tire inflation/deflation system, such as a CTIS is shown. The wheel valve assembly 300 may be utilized in the CTIS 10, as shown and described in connection with FIG. 1, by replacing the wheel valve assembly 18; or the wheel valve assembly 300 may be used in a different tire inflation/deflation system.

Referring particularly to FIG. 11, the wheel valve assembly 300 includes a valve body 302. The valve body 302 may be substantially cylindrical in geometry. A tire port 312 is disposed toward the bottom of the valve body 302. The tire port 312 may be in selective fluid communication with a tire (e.g., tire 20) and a control unit (e.g., control 14), as shown in FIG. 1 for example.

At least one control chamber 324 that is fluidly connected to one or more control ports (hidden from view) also are formed in the valve body 302. The control ports are in fluid communication with the control unit 14 and the control chamber 324. The control ports are in selective fluid communication with the tire port 312 via the control chamber 324 and a diaphragm 326 (described in further detail below).

In the illustrated embodiment, the wheel valve assembly 300 includes a valve cover 328. The valve cover 328 is coupled with the valve body 302 via suitable fasteners (not shown). As shown, the valve cover 328 forms an internal cover chamber 330. The cover chamber 330 and the control chamber 324 are separated by, and partially defined by, the diaphragm 326. As shown, the valve cover 328 at least partially contains a biasing member 332 and a backing plate 334.

In exemplary embodiments, the diaphragm 326 includes a substantially discoid member including a first portion 326a and a second portion 326b. The first portion 326a is coupled between the cover 328 and valve body 302 such that the second portion 326b of the diaphragm 326 may actuate in an axial direction. The second portion 326b includes a first axially extending protrusion 327a. The first protrusion 327a defines a surface which selectively sealingly engages a protruding portion 318 of the valve body 302. The second portion 326b also includes a second axially extending protrusion 327b which projects opposite the first protrusion 327a. The second protrusion 327b is engaged with, and at least partially located within, a complimentary depression in the lower surface of the backing plate 334. The backing plate 334 includes a substantially cylindrical wall 335, which may guide the backing plate 334 during actuation of the diaphragm 326.

At a static state, the biasing member 332 engages an interior surface of the valve cover 328 at a first end, and engages a surface of the backing plate 334 at a second end. The backing plate 334 engages the diaphragm 326 and via the biasing member 332 drives the diaphragm 326 into sealing contact with the protruding portion 318. The diaphragm 326 thereby seals a tire port channel 322.

During inflation, deflation, or pressure checks of the tire, pressurized fluid enters the control chamber 324 via the control port(s) (hidden from view). The increased pressure in the control chamber 324 exerts a force on the diaphragm 326 in the axial direction and thereby at least partially compresses the biasing member 332.

When the wheel valve assembly 300 is exposed to high temperatures during a static state, pressure may increase in the cover chamber 330. The increased pressure in the cover chamber 330 may degrade the overall performance of the wheel valve assembly 300. For example, the increased pressure in the cover chamber 330 may increase the axial force sealing the diaphragm 326 against the tire port 312 protruding portion 318. The necessary pressure in the control chamber 324 to disengage the diaphragm 326 from the protruding portion 318 may then be increased.

Referring particularly to FIG. 12, and also back to FIG. 11, in order to overcome increased pressure in the cover chamber 330, the wheel valve assembly 300 includes an exemplary vent valve 340.

As shown, the vent valve 340 may include a first fluid passage 342, which may be defined by the valve cover 328, and a second fluid passage 344, which may be defined by the valve body 302. The first fluid passage 342 may extend radially through the valve cover 328, and the second fluid passage 344 may extend radially through the valve body 302. As shown, the first and second fluid passage 342, 344 may be in fluid communication with each other via a third (axial) fluid passage 346.

As shown in the illustrated embodiment, the vent valve 340 includes one or more resilient fluid pressure-energized valve elements 350 that are interposed between the first and second fluid passages 342, 344. In the illustrated embodiment, the one or more resilient fluid pressure-energized valve elements 350 serve as one or more check valve elements that are configured to permit fluid flow in one direction through the third fluid passage 346, and are configured to restrict fluid flow in an opposite direction through the fluid passage 346.

Any suitable resilient fluid pressure-energized valve element 350 may be utilized to provide the desired check valve functionality. For example, the resilient fluid pressure-energized valve element 350 may be a resilient lip seal, such as a U-cup seal, a duck-bill seal, or the like. Unlike a spring-loaded ball check valve which primarily is energized by spring force, the resilient fluid pressure-energized valve element 350 primarily is energized in response to fluid pressure acting on the valve element. The exemplary resilient fluid pressure-energized valve element 350 may consist of only a single component, thereby simplifying construction and reliable performance when compared to a spring-loaded ball check valve assembly.

In the illustrated embodiment, each resilient fluid pressure-energized valve element 350 is a single component in the form of a U-cup seal 350 made with a resilient material. The configuration of the U-cup seal 350 and operation thereof may be substantially similar or the same as that of the U-cup seal 65 described above in connection with the wheel valve assembly 18. Also as shown in the illustrated embodiment, to mitigate contamination of the valve 300, a multiple-redundant configuration resilient fluid pressure-energized valve elements 350 is provided, which also may be substantially the same as or similar to the redundant configuration described in connection with the wheel valve assembly 18.

In exemplary embodiments, the resilient fluid pressure-energized valve element(s) 350 (e.g., U-cup seals) are mounted on a plug 352 that is inserted into the flow path between the first (radial) fluid passage 342 and the second (radial) fluid passage 344, such as within a widened portion 354, or cavity, of the third (axial) fluid passage 346. The resilient fluid pressure-energized valve element(s) 350 (e.g., U-cup seals) may be held on the plug 352 via retaining ring(s) 356 or other suitable holding structure(s).

For embodiments where a single resilient fluid pressure-energized valve element 350 (e.g., U-cup seal) is utilized, when the pressure in the cover chamber 330 reaches a predetermined level, the resilient fluid pressure-energized valve element 350 (e.g., U-cup seal) is activated to open to communicate pressurized fluid from the cover chamber 330 to the control chamber 324 until the pressure therebetween is substantially equalized and/or until the fluid pressure-energized valve element (e.g., U-cup seal) is configured to close based on the pressure differential. When the wheel valve assembly 300 is activated and the diaphragm 326 is sealingly disengaged from the protruding portion 318, the pressurized air within the control chamber 324 does not communicate with the cover chamber 330 because the fluid pressure-energized valve element 350 (e.g., U-cup seal) prevents such fluid communication.

For embodiments where a multiple-redundant resilient fluid-energized valve element configuration is utilized, an isolation gap 358 may be provided between spaced apart fluid pressure-energized valve elements 350. When fluid pressure from the cover chamber 330 is greater than fluid pressure in the isolation gap 358 by a specified amount, the first U-cup valve element 350a will be activated to open and vent into the isolation gap 358. When fluid pressure in the isolation gap 358 is greater than fluid pressure from the control chamber 324 by a specified amount, the second U-cup valve element 350b will be activated to open to vent from the isolation gap 358 to the control chamber 324.

Exemplary valve assemblies for a tire inflation/deflation system have been described herein. The valve assembly includes a body having a control port and a tire port, and a valve member for fluidly connecting or disconnecting the control port with the tire port. In exemplary embodiments, the valve includes a fluid-operated damper having a damper chamber for controlling a timing of the valve member. A vent valve is provided for permitting excess fluid pressure to escape from the damper chamber. In another embodiment, the valve member includes a diaphragm separating first and second fluid chambers. A vent passage and at least one resilient fluid pressure-operated valve element are provided for enabling fluid to vent from the first chamber to the second chamber. Multiple-redundant vent valves or valve elements may be provided to form an isolation gap that restricts contamination of the valve assembly.

According to an aspect, the vent valve or vent valve element helps to maintain a set pressure in the valve assembly, prevent contamination, and/or turning a potentially negative aspect of leakage or pressure build-up in the valve assembly into a positive attribute that provides more secure sealing.

According to an aspect, a valve for use in an inflation/deflation system, includes: a valve body having a first inlet/outlet port fluidly connectable to a second inlet/outlet port; a valve member movable within the valve body between a first position and a second position for fluidly connecting or disconnecting the first inlet/outlet port and the second inlet/outlet port; and a fluid-operated damper operably connected to the valve member to dampen movement of the valve member from the second position to the first position; wherein, when in a first state, the first inlet/outlet port is fluidly disconnected from the second inlet/outlet port by the valve member; wherein the valve is configured to transition to a second state when a fluid pressure at the first inlet/outlet port is at or above a prescribed pressure threshold, and when in the second state the first inlet/outlet port is fluidly disconnected from the second inlet/outlet port; wherein, when the valve is in the second state, lowering the fluid pressure below the prescribed pressure threshold causes the valve to transition from the second state to a third state; wherein, when in the third state, the first inlet/outlet port is fluidly connected to the second inlet/outlet port while the damper dampens movement of the valve member from the second position to the first position to maintain the valve in the third state for a prescribed period of time; wherein the damper includes a damper fluid chamber; and wherein the valve further includes a vent passage fluidly connected to the damper fluid chamber, and a vent valve configured to open and close the vent passage, such that when the vent passage is opened by the vent valve fluid is permitted to vent from the damper fluid chamber.

Embodiments may include one or more of the following additional features, separately or in any combination.

In some embodiments, the valve body forms a primary chamber, the primary chamber being fluidly connectable to the first inlet/outlet port and the second inlet/outlet port.

In some embodiments, the vent passage fluidly connects the damper fluid chamber to the primary chamber.

In some embodiments, the vent valve is a check valve.

In some embodiments, the check valve is activated to open the vent passage when fluid pressure in the damper fluid chamber is at a prescribed pressure level that is greater than a pressure level in the primary chamber.

In some embodiments, the vent valve is a resilient fluid pressure-energized valve element.

In some embodiments, the resilient fluid pressure-energized valve element is a lip seal valve element.

In some embodiments, the lip seal valve element is a U-cup seal valve element.

In some embodiments, at least a portion of the vent passage extends through a portion of the valve member and/or a portion of the damper.

In some embodiments, the vent valve is disposed in a flow gap formed between a portion of the damper and a portion of the valve member.

In some embodiments, the vent valve is a first vent valve, the valve further including a second vent valve downstream of the first vent valve such that an isolation gap is formed between the first vent valve and second vent valve.

In some embodiments, each of the first vent valve and the second vent valve is a U-cup seal vent valve.

In some embodiments, the valve body forms a primary chamber, the primary chamber being fluidly connectable to the first inlet/outlet port and the second inlet/outlet port; the damper has a portion moveable from the first position to the second position by a first force, and moveable from the second position to the first position by a second force, wherein the first force is less than the second force; the valve further comprising: a timing resilient member biasing the valve member in a first axial direction to bias the valve member in the first position; a charge member moveable within the primary chamber to move the valve member from the first position to the second position.

In some embodiments, when the valve member abuts the charge member the first inlet/outlet port and the second inlet/outlet port are fluidly disconnected.

In some embodiments, when in the first state, the valve member and the charge member abut one another within a first portion of the primary chamber to fluidly disconnect the first inlet/outlet port and the second inlet/outlet port.

In some embodiments, when in the second state, the valve member and the charge member abut one another within a second portion of the primary chamber, the second portion of the primary chamber being axially spaced in a second axial direction opposite the first axial direction from the first portion of the primary chamber.

In some embodiments, when in the third state, the valve member and the charge member are axially spaced from one another to allow fluid flow therebetween, thereby fluidly connecting the first inlet/outlet port and the second inlet/outlet port.

In some embodiments, the damper fluid chamber is a timing chamber, the damper including a timing piston moveable within a timing chamber, wherein the timing piston is moveable from the first position in the timing chamber to the second position in the timing chamber by the first force, and moveable from the second position to the first position by the second force.

In some embodiments, the valve member is moveable with the timing piston, and moveable within the primary chamber, wherein the timing chamber is fluidly disconnected from the primary chamber.

In some embodiments, the timing resilient member biases the valve member and the timing piston in the first axial direction.

In some embodiments, the charge member includes a charge piston moveable within the primary chamber, the charge piston having a flow passage for fluidly connecting the first inlet/outlet port with the second inlet/outlet port, wherein when the valve member abuts the charge piston the flow passage is closed thereby fluidly disconnecting first inlet/outlet port and the second inlet/outlet port.

In some embodiments, the valve further including a charge resilient member that biases the charge member in the first axial direction.

In some embodiments, when in the first state, the valve member and the charge piston abut one another within the first portion of the primary chamber to fluidly disconnect the first inlet/outlet port and the second inlet/outlet port.

In some embodiments, when in the second state, the valve member and the charge piston abut one another within the second portion of the primary chamber.

In some embodiments, when in the third state, the valve member and the charge piston are axially spaced from one another to allow fluid flow therebetween, thereby fluidly connecting the first inlet/outlet port and the second inlet/outlet port.

In some embodiments, the valve member and/or the damper includes a flow passage fluidly connecting the primary chamber to a variable volume chamber.

In some embodiments, the damper fluid chamber is a timing chamber, the damper further comprising: a check valve for preventing fluid flow from a first portion of a timing chamber to a second portion of the timing chamber, and for allowing fluid flow from the second portion of the timing chamber to the first portion of the timing chamber.

In some embodiments, the valve further includes a restrictive helical flow passage fluidly connecting a first portion of the damper fluid chamber to a second portion of the damper fluid chamber, the restrictive helical flow passage being configured to restrict fluid flow from a first portion of a timing chamber to a second portion of the timing chamber.

According to another aspect, a valve for use in an inflation/deflation system, includes: a valve body having a first inlet/outlet port fluidly connectable to a second inlet/outlet port; a valve member movable within the valve body between a first position and a second position for fluidly connecting or disconnecting the first inlet/outlet port and the second inlet/outlet port; and a fluid-operated damper operably connected to the valve member to dampen movement of the valve member from the second position to the first position; wherein, when in a first state, the first inlet/outlet port is fluidly disconnected from the second inlet/outlet port by the valve member; wherein the valve is configured to transition to a second state when a fluid pressure at the first inlet/outlet port is at or above a prescribed pressure threshold, and when in the second state the first inlet/outlet port is fluidly disconnected from the second inlet/outlet port; wherein, when the valve is in the second state, lowering the fluid pressure below the prescribed pressure threshold causes the valve to transition from the second state to a third state; wherein, when in the third state, the first inlet/outlet port is fluidly connected to the second inlet/outlet port while the damper dampens movement of the valve member from the second position to the first position to maintain the valve in the third state for a prescribed period of time; wherein the fluid-operated damper includes a body portion that at least partially forms a fluid timing chamber, and a timing piston movable in the timing chamber, the timing piston separating the timing chamber into a first portion and a second portion; and wherein the body portion includes a restrictive fluid passage for restricting fluid flow from the first portion of a timing chamber to the second portion of the timing chamber.

Embodiments may include one or more of the following additional features, separately or in any combination.

In some embodiments, the restrictive fluid passage is a restrictive helical passage that encompasses a longitudinal axis of the valve member and/or the damper.

In some embodiments, the body portion is at least partially formed by a sleeve, wherein the restrictive helical passage is formed by a helical groove in a radially outer surface of the sleeve, and wherein at least one radial passage fluidly connects the timing chamber to the restrictive helical passage.

According to another aspect, a valve for use in an inflation/deflation system, includes: a valve body having a first inlet/outlet port fluidly connectable to a second inlet/outlet port; a valve member movable within the valve body between a first position and a second position for fluidly connecting or disconnecting the first inlet/outlet port and the second inlet/outlet port; and a fluid-operated damper operably connected to the valve member to dampen movement of the valve member from the second position to the first position; wherein, when in a first state, the first inlet/outlet port is fluidly disconnected from the second inlet/outlet port by the valve member; wherein the valve is configured to transition to a second state when a fluid pressure at the first inlet/outlet port is at or above a prescribed pressure threshold, and when in the second state the first inlet/outlet port is fluidly disconnected from the second inlet/outlet port; wherein, when the valve is in the second state, lowering the fluid pressure below the prescribed pressure threshold causes the valve to transition from the second state to a third state; wherein, when in the third state, the first inlet/outlet port is fluidly connected to the second inlet/outlet port while the damper dampens movement of the valve member from the second position to the first position to maintain the valve in the third state for a prescribed period of time; wherein the damper includes a damper fluid chamber, a timing piston movable in the damper fluid chamber, and a seal member disposed in a radial groove of the timing piston for abutting a surface forming at least a portion of the damper fluid chamber, wherein the seal member is movable within the radial groove of the timing piston to serve as a check valve, the check valve being configured to restrict fluid flow from a first portion of the timing chamber to a second portion of the timing chamber across the radial groove when the seal member engages a first axial face of the radial groove, and the check valve being configured to permit fluid flow from the second portion of the timing chamber to the first portion of the timing chamber across the radial groove when the seal member engages a second axial face of the radial groove; and wherein at least one of the first axial face and the second axial face includes a stepped surface for reducing surface area contact with the seal member.

According to another aspect, a valve assembly includes: a body having a first body portion and a second body portion; a diaphragm disposed between the first body portion and the second body portion; a biasing member disposed between the second body portion and the diaphragm; a first chamber at least partially formed by the first body portion and the diaphragm; a second chamber at least partially formed by the second body portion and the diaphragm; a control port formed by the first body portion and in fluid communication with the first chamber; a tire port formed by the first body portion and in selective fluid communication with the first chamber; a fluid passage fluidly connecting the first chamber and the second chamber; and a resilient fluid pressure-energized valve element disposed in the fluid passage; wherein the resilient fluid pressure-energized valve element is configured to open or close the fluid passage in response to a fluid pressure differential between the first chamber and the second chamber that is communicated to opposite sides of the resilient fluid pressure-energized valve element.

Embodiments may include one or more of the following additional features, separately or in any combination.

In some embodiments, the resilient fluid pressure-energized valve element is a lip seal valve element.

In some embodiments, the lip seal valve element is a U-cup seal valve element.

In some embodiments, the resilient fluid pressure-energized valve element is configured to open the fluid passage when fluid pressure in the second chamber is at a prescribed pressure level that is greater than a pressure level in the first chamber.

In some embodiments, the resilient fluid pressure-energized valve element is a first resilient fluid pressure-energized valve element, the valve assembly further including a second resilient fluid pressure-energized valve element downstream of the first vent valve such that an isolation gap is formed between the first fluid pressure-energized valve element and the second fluid pressure-energized valve element.

In some embodiments, each of the first resilient fluid pressure-energized valve element and the second first resilient fluid pressure-energized valve element is lip seal valve element.

According to another aspect, a central inflation/deflation system for a vehicle, includes: the valve according to any of the foregoing aspects or embodiments; a tire forming a fluid reservoir fluidly connected to the second inlet/outlet port of the valve; a fluid control system fluidly connected to the first inlet/outlet port of the valve; and a pressure source with an outlet fluidly connected to an inlet of the control system.

It is understood that embodiments of the subject matter described in this disclosure can be implemented in combination with digital electronic circuitry, controllers, processors, computer software, firmware, and/or hardware. For example, embodiments may be implemented in a tire inflation/deflation system that uses one or more modules of computer program with instructions encoded on a non-transitory computer-readable medium for execution by, or to control the operation of, data processing apparatus. The operations may include physical manipulations of physical quantities. Usually, though not necessarily, the physical quantities take the form of electrical or magnetic signals capable of being stored, transferred, combined, compared, and otherwise manipulated in a logic and the like. The computer-readable medium may be a hard-drive, a machine-readable storage device, a memory device, or a combination of one or more of the foregoing. The controller may include all apparatus, devices, and machines for processing data, including by way of example a programmable processor, a computer, or multiple processors or computers.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An operable connection or coupling may include the entities being integral and unitary with each other.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve for use in an inflation/deflation system, comprising:
    a valve body having a first inlet/outlet port fluidly connectable to a second inlet/outlet port;
    a valve member movable within the valve body between a first position and a second position for fluidly connecting or disconnecting the first inlet/outlet port and the second inlet/outlet port; and
    a fluid-operated damper operably connected to the valve member to dampen movement of the valve member from the second position to the first position;
    wherein, when in a first state, the first inlet/outlet port is fluidly disconnected from the second inlet/outlet port by the valve member;
    wherein the valve is configured to transition to a second state when a fluid pressure at the first inlet/outlet port is at or above a prescribed pressure threshold, and when in the second state the first inlet/outlet port is fluidly disconnected from the second inlet/outlet port;
    wherein, when the valve is in the second state, lowering the fluid pressure below the prescribed pressure threshold causes the valve to transition from the second state to a third state;
    wherein, when in the third state, the first inlet/outlet port is fluidly connected to the second inlet/outlet port while the damper dampens movement of the valve member from the second position to the first position to maintain the valve in the third state for a prescribed period of time;
    wherein the damper includes a damper fluid chamber;
    wherein the valve further includes a vent passage fluidly connected to the damper fluid chamber, and a vent valve configured to open and close the vent passage, such that when the vent passage is opened by the vent valve fluid is permitted to vent from the damper fluid chamber;
    wherein the valve body forms a primary chamber, the primary chamber being fluidly connectable to the first inlet/outlet port and the second inlet/outlet port; and
    wherein the vent passage fluidly connects the damper fluid chamber to the primary chamber.

2. The valve according to claim 1, wherein the vent valve is a check valve.

3. The valve according to claim 2, wherein the check valve is activated to open the vent passage when fluid pressure in the damper fluid chamber is at a prescribed pressure level that is greater than a pressure level in the primary chamber.

4. The valve according to claim 2, wherein the vent valve is a resilient fluid pressure-energized valve element.

5. The valve according to claim 4, wherein the resilient fluid pressure-energized valve element is a lip seal valve element.

6. The valve according to claim 5, wherein the lip seal valve element is a U-cup seal valve element.

7. The valve according to claim 1, wherein at least a portion of the vent passage extends through a portion of the valve member and/or a portion of the damper.

8. The valve according to claim 7, wherein the vent valve is disposed in a flow gap formed between a portion of the damper and a portion of the valve member.

9. The valve according to claim 1, wherein the vent valve is a first vent valve, the valve further including a second vent valve downstream of the first vent valve such that an isolation gap is formed between the first vent valve and second vent valve.

10. The valve according to claim 9, wherein each of the first vent valve and the second vent valve is a U-cup seal vent valve.

11. The valve according to claim 1, wherein:
    the valve body forms a primary chamber, the primary chamber being fluidly connectable to the first inlet/outlet port and the second inlet/outlet port;
    the damper has a portion moveable from the first position to the second position by a first force, and moveable from the second position to the first position by a second force, wherein the first force is less than the second force;
    the valve further comprising:
    a timing resilient member biasing the valve member in a first axial direction to bias the valve member in the first position;
    a charge member moveable within the primary chamber to move the valve member from the first position to the second position.

12. The valve according to claim 11,
    wherein when the valve member abuts the charge member the first inlet/outlet port and the second inlet/outlet port are fluidly disconnected;
    wherein when in the first state, the valve member and the charge member abut one another within a first portion of the primary chamber to fluidly disconnect the first inlet/outlet port and the second inlet/outlet port;
    wherein when in the second state, the valve member and the charge member abut one another within a second portion of the primary chamber, the second portion of the primary chamber being axially spaced in a second axial direction opposite the first axial direction from the first portion of the primary chamber; and wherein when in the third state, the valve member and the charge member are axially spaced from one another to allow fluid flow therebetween, thereby fluidly connecting the first inlet/outlet port and the second inlet/outlet port.

13. The valve according to claim 11,
wherein the damper fluid chamber is a timing chamber, the damper including a timing piston moveable within a timing chamber, wherein the timing piston is moveable from the first position in the timing chamber to the second position in the timing chamber by the first force, and moveable from the second position to the first position by the second force;
wherein the valve member is moveable with the timing piston, and moveable within the primary chamber, wherein the timing chamber is fluidly disconnected from the primary chamber;
wherein the timing resilient member biases the valve member and the timing piston in the first axial direction;
wherein the charge member includes a charge piston moveable within the primary chamber, the charge piston having a flow passage for fluidly connecting the first inlet/outlet port with the second inlet/outlet port, wherein when the valve member abuts the charge piston the flow passage is closed thereby fluidly disconnecting first inlet/outlet port and the second inlet/outlet port;
the valve further including a charge resilient member that biases the charge member in the first axial direction;
wherein when in the first state, the valve member and the charge piston abut one another within the first portion of the primary chamber to fluidly disconnect the first inlet/outlet port and the second inlet/outlet port;
wherein when in the second state, the valve member and the charge piston abut one another within the second portion of the primary chamber; and
wherein when in the third state, the valve member and the charge piston are axially spaced from one another to allow fluid flow therebetween, thereby fluidly connecting the first inlet/outlet port and the second inlet/outlet port.

14. The valve according to claim 11, wherein the valve member and/or the damper includes a flow passage fluidly connecting the primary chamber to a variable volume chamber.

15. A valve for use in an inflation/deflation system, comprising:
a valve body having a first inlet/outlet port fluidly connectable to a second inlet/outlet port;
a valve member movable within the valve body between a first position and a second position for fluidly connecting or disconnecting the first inlet/outlet port and the second inlet/outlet port; and
a fluid-operated damper operably connected to the valve member to dampen movement of the valve member from the second position to the first position;
wherein, when in a first state, the first inlet/outlet port is fluidly disconnected from the second inlet/outlet port by the valve member;
wherein the valve is configured to transition to a second state when a fluid pressure at the first inlet/outlet port is at or above a prescribed pressure threshold, and when in the second state the first inlet/outlet port is fluidly disconnected from the second inlet/outlet port;
wherein, when the valve is in the second state, lowering the fluid pressure below the prescribed pressure threshold causes the valve to transition from the second state to a third state;
wherein, when in the third state, the first inlet/outlet port is fluidly connected to the second inlet/outlet port while the damper dampens movement of the valve member from the second position to the first position to maintain the valve in the third state for a prescribed period of time;
wherein the fluid-operated damper includes a body portion that at least partially forms a fluid timing chamber, and a timing piston movable in the timing chamber, the timing piston separating the timing chamber into a first portion and a second portion;
wherein the body portion includes a fluid passage for restricting fluid flow from the first portion of a timing chamber to the second portion of the timing chamber; and
wherein the fluid passage is a helical passage that encompasses a longitudinal axis of the valve member and/or the damper.

16. The valve according to claim 15, wherein the body portion is at least partially formed by a sleeve, wherein the helical passage is formed by a helical groove in a radially outer surface of the sleeve, and wherein at least one radial passage fluidly connects the timing chamber to the helical passage.

17. A valve for use in an inflation/deflation system, comprising:
a valve body having a first inlet/outlet port fluidly connectable to a second inlet/outlet port;
a valve member movable within the valve body between a first position and a second position for fluidly connecting or disconnecting the first inlet/outlet port and the second inlet/outlet port; and
a fluid-operated damper operably connected to the valve member to dampen movement of the valve member from the second position to the first position;
wherein, when in a first state, the first inlet/outlet port is fluidly disconnected from the second inlet/outlet port by the valve member;
wherein the valve is configured to transition to a second state when a fluid pressure at the first inlet/outlet port is at or above a prescribed pressure threshold, and when in the second state the first inlet/outlet port is fluidly disconnected from the second inlet/outlet port;
wherein, when the valve is in the second state, lowering the fluid pressure below the prescribed pressure threshold causes the valve to transition from the second state to a third state;
wherein, when in the third state, the first inlet/outlet port is fluidly connected to the second inlet/outlet port while the damper dampens movement of the valve member from the second position to the first position to maintain the valve in the third state for a prescribed period of time;
wherein the damper includes a damper fluid chamber, a timing piston movable in the damper fluid chamber, and a seal member disposed in a radial groove of the timing piston for abutting a surface forming at least a portion of the damper fluid chamber,
wherein the seal member is movable within the radial groove of the timing piston to serve as a check valve, the check valve being configured to restrict fluid flow from a first portion of the timing chamber to a second portion of the timing chamber across the radial groove when the seal member engages a first axial face of the radial groove, and the check valve being configured to permit fluid flow from the second portion of the timing chamber to the first portion of the timing chamber across the radial groove when the seal member engages a second axial face of the radial groove; and wherein at least one of the first axial face and the second axial face includes a stepped surface for reducing surface area contact with the seal member.

* * * * *